(12) United States Patent
Chou et al.

(10) Patent No.: US 10,686,651 B2
(45) Date of Patent: Jun. 16, 2020

(54) END-TO-END TECHNIQUES TO CREATE PM (PERFORMANCE MEASUREMENT) THRESHOLDS AT NFV (NETWORK FUNCTION VIRTUALIZATION) INFRASTRUCTURE

(71) Applicant: Intel IP Corporation, Santa Clara, CA (US)

(72) Inventors: Joey Chou, Scottsdale, AZ (US); Xuesong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/303,298

(22) PCT Filed: Mar. 9, 2017

(86) PCT No.: PCT/US2017/021488
§ 371 (c)(1),
(2) Date: Nov. 20, 2018

(87) PCT Pub. No.: WO2017/222613
PCT Pub. Date: Dec. 28, 2017

(65) Prior Publication Data
US 2019/0215235 A1 Jul. 11, 2019

Related U.S. Application Data

(60) Provisional application No. 62/352,449, filed on Jun. 20, 2016.

(51) Int. Cl.
*G06F 15/16* (2006.01)
*G06F 15/173* (2006.01)
(Continued)

(52) U.S. Cl.
CPC ...... *H04L 41/0681* (2013.01); *G06F 9/45558* (2013.01); *H04L 43/08* (2013.01);
(Continued)

(58) Field of Classification Search
CPC ...... H04L 43/08; H04L 43/16; H04L 41/0681
See application file for complete search history.

(56) References Cited

U.S. PATENT DOCUMENTS

2016/0205004 A1* 7/2016 Chou .................. H04L 43/08
709/224
2016/0212016 A1* 7/2016 Vrzic .................. H04L 41/5051
(Continued)

OTHER PUBLICATIONS

ETSI GS NFV-IFA 006 V2.1.1, Network Functions Virtualisation (NFV); Management and Orchestration; Vi-Vnfm reference point—Interface and Information Model Specification, Apr. 2016, pp. 1-109 (Year: 2016).*
(Continued)

*Primary Examiner* — Hieu T Hoang
(74) *Attorney, Agent, or Firm* — Eschweiler & Potashnik, LLC

(57) ABSTRACT

End-to-end techniques for creating PM (Performance Measurement) thresholds at a NFVI (Network Function Virtualization Infrastructure) are discussed. In various aspects, techniques are discussed for: creating PM jobs at the NFVI based on a request from a NM (Network Manager), creating thresholds to monitor PM data collected in connection with PM jobs based on a request from the NM, subscribing the NM to TC (threshold crossing) notifications based on a request from the NM, and reporting TC notifications to the NM.

25 Claims, 14 Drawing Sheets

(51) Int. Cl.
*H04L 12/24* (2006.01)
*H04L 12/26* (2006.01)
*G06F 9/455* (2018.01)

(52) U.S. Cl.
CPC .... *H04L 43/16* (2013.01); *G06F 2009/45591* (2013.01); *G06F 2009/45595* (2013.01)

(56) References Cited

U.S. PATENT DOCUMENTS

| | | | |
|---|---|---|---|
| 2016/0269925 A1* | 9/2016 | Chou | H04W 28/0226 |
| 2016/0353226 A1* | 12/2016 | Rao | H04L 41/06 |
| 2016/0364226 A1* | 12/2016 | Takano | G06F 8/65 |
| 2017/0150399 A1* | 5/2017 | Kedalagudde | H04L 41/0896 |
| 2017/0171015 A1* | 6/2017 | Lin | H04L 12/4641 |
| 2018/0013656 A1* | 1/2018 | Chen | H04W 24/04 |
| 2018/0270111 A1* | 9/2018 | Oohira | G06F 9/45558 |
| 2019/0052528 A1* | 2/2019 | Yoshimura | H04L 41/0806 |
| 2019/0065234 A1* | 2/2019 | Zembutsu | G06F 9/45558 |
| 2019/0073235 A1* | 3/2019 | Hoshino | G06F 8/60 |
| 2019/0073269 A1* | 3/2019 | Chou | H04L 43/08 |

OTHER PUBLICATIONS

International Search Report and Written Opinion dated May 19, 2017 for PCT Application PCT/US2017/021488.
"3rd Generation Partnership Project; Technical Specification Group Services and System Aspects; Telecommunication management; Management concept, architecture and requirements for mobile networks that include virtualized network functions (Release 14)." 3GPP TS 28.500 V1.1.0 (Jul. 2016) Advanced Pro Lte. 26 pages.
"3rd Generation Partnership Project; Technical Specification Group Services and System Aspects; Telecommunication management; Performance Management (PM) for mobile networks that include virtualized network functions; Requirements (Release 14)." 3GPP TS 28.520 V0.5.0 (Jun. 2016). Advan Lte. 21 pages.
"3rd Generation Partnership Project; Technical Specification Group Services and System Aspects; Telecommunication management; Performance Management (PM) for mobile networks that include virtualized network functions; Procedures (Release 14)." 3GPP TS 28.521 V.0.2.0 (Jun. 2016). Advan Lte. 9 pages.
"3rd Generation Partnership Project; Technical Specification Group Services and System Aspects; Telecommunication management; Performance Management (PM) Integration Reference Point (IRP); Information Service (IS) (Release 13)." 3GPP TS 32.412 V13.0.0 (Jan. 2016). Advanced Pro Lte. 67 pages.
"3rd Generation Partnership Project; Technical Specification Group Services and System Aspects; Telecommunication management; Performance Management (PM) Integration Reference Point (IRP); Information Service (IS) (Release 14)." 3GPP TS 32.412 V14.0.0 (Dec. 2016). Advanced Pro Lte. 68 pages.
"Network Function Virtualisation (NFV); Management and Orchestration; Vi-Vnfm Reference Point—Interface and Information Model Specification." ETSI GS NFV-IFA006 V0.9.0 (Feb. 2016) 114 pages.
"Network Function Virtualisation (NFV); Management and Orchestration; Vi-Vnfm Reference Point—Interface and Information Model Specification." ETSI GS NFV-IFA006 V0.9.0 (Feb. 2016) 122 pages.
"Network Functions Virtualisation (NFV); Management and Orchestration; Ve-Vnfm Reference Point—Interface and Information Model Specification." GS NFV IFA008 V0.9.0 (Jun. 2016). ETSI. 81 pages.
"3rd Generation Partnership Project; Technical Specification Group Services and System Aspects; Telecommunication management; Performance Management (PM) for mobile networks that include virtualized network functions; Requirements (Release 14)." 3GPP TS 28.520 V0.4.0 (Apr. 2016). Advanced Lte. 18 pages.
"Network Function Virtualisation (NFV); Management and Orchestration; Vi-Vnfm Reference Point—Interface and Information Model Specificiation." ETSI GS NVF-IFA006 V0.10.0 (Feb. 2016). 30 pages.
"Network Function Virtualisation (NFV); Management and Orchestration; Vi-Vnfm Reference Point—Interface and Information Model Specification." ETSI GS NVF-IFA006 V0.10.0 (Feb. 2016). 84 pages.
"Digital cellular telecommunications system (Phase 2+) (GSM); Universal Mobile Telecommunications System (UMTS); LTE; Telecommunication management; Performance Management (PM); Concept and requirements (3GPP TS 32.401 version 13.0.0 Release 13)". Advanced Pro LTE. ETSI TS 132 401 V.13.0.0 (Mar. 2016). 32 pages.
"Digital cellular telecommunications system (Phase 2+); Universal Mobile Telecommunications System (UMTS); LTE; Telecommunication management; Performance Management (PM) Integration Reference Point (IRP): Requirements (3GPP TS 32.411 version 13.0.0 Release 13)." Advanced Pro Lte. ETSI TS 132 411 V13.0.0 (Feb. 2016). 11 pages.

* cited by examiner

END-TO-END TECHNIQUES TO CREATE PM (PERFORMANCE MEASUREMENT) THRESHOLDS AT NFV (NETWORK FUNCTION VIRTUALIZATION) INFRASTRUCTURE

REFERENCE TO RELATED APPLICATIONS

This application is a National Phase entry application of International Patent Application No. PCT/US2017/021488 filed Mar. 9, 2017, which claims priority to U.S. Provisional Application 62/352,449 filed on Jun. 20, 2016, entitled "AN END-TO-END METHOD TO CREATE A PM THRESHOLD AT NFV INFRASTRUCTURE" in the name of Joey Chou et al. and is hereby incorporated by reference in its entirety.

FIELD

The present disclosure relates to core network technology of a communication network, and more specifically to techniques for operations associated with thresholds in connection with virtual network functions (VNFs).

BACKGROUND

Network Function Virtualization (NFV) involves the replacement of physical network nodes with Virtual Network Functions (VNFs) implemented via Virtualization Resources (VRs) that perform the same function as the physical node.

DETAILED DESCRIPTION

Figure 1:
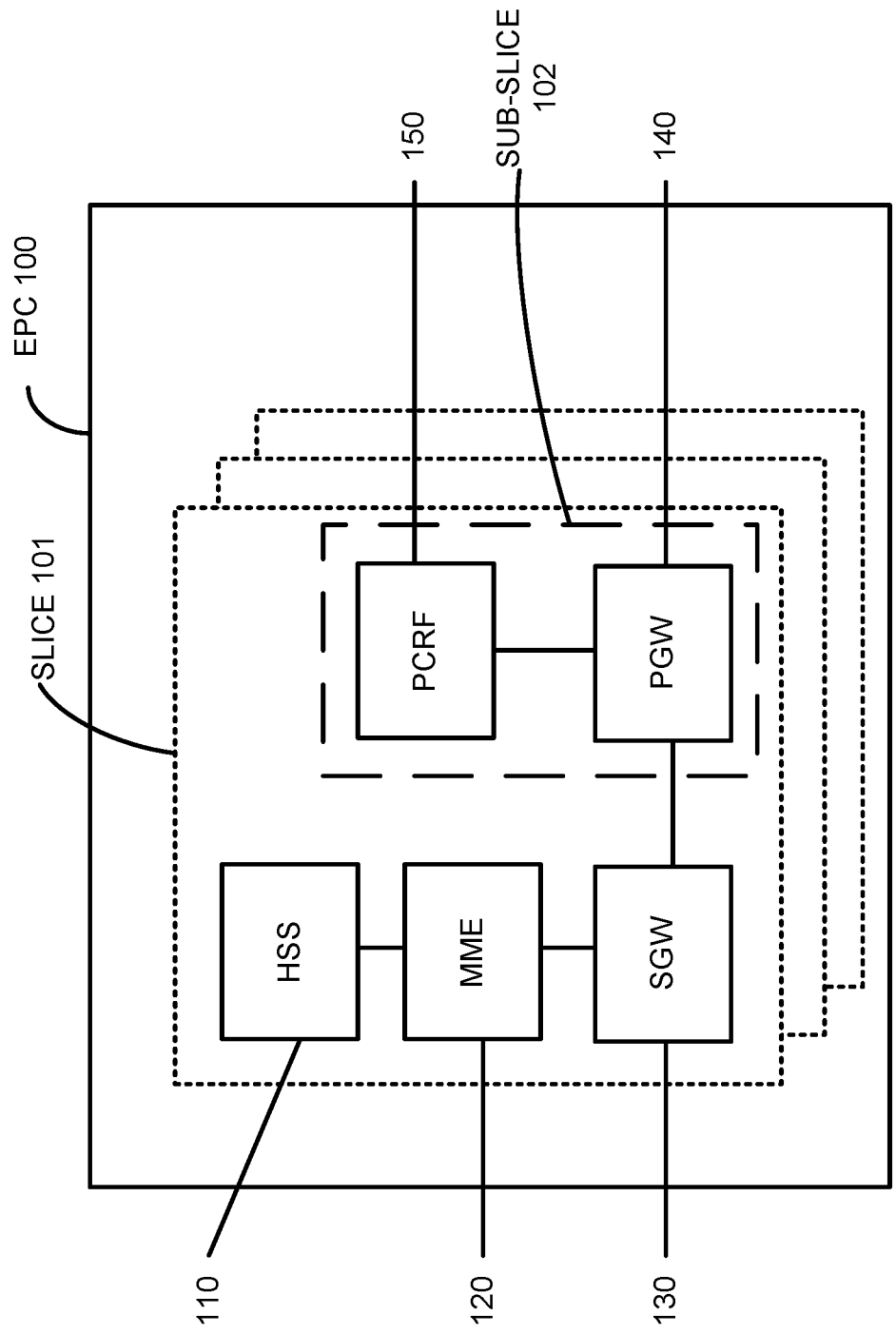
FIG. 1 is a diagram illustrating components of a network in accordance with some embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates components of a network in accordance with some embodiments. In various aspects, part(s) or all of one or more of the components illustrated in connection with FIG. 1 can be implemented as virtual network functions (VNFs) in connection with various aspects described herein. An Evolved Packet Core (EPC) network 100 is shown to include a Home Subscriber Server (HSS) 110, a Mobility Management Entity (MME) 120, a Serving GateWay (SGW) 130, a Packet Data Network (PDN) GateWay (PGW) 140, a Policy and Charging Rules Function (PCRF) 150.

The HSS 110 comprises one or more databases for network users, including subscription-related information to support the network entities' handling of communication sessions. For example, the HSS 110 may provide support for routing/roaming, authentication, authorization, naming/addressing resolution, location dependencies, etc. The EPC network 100 may comprise one or several HSSs 110, depending on the number of mobile subscribers, on the capacity of the equipment, on the organization of the network, etc.

The MME 120 is similar in function to the control plane of legacy Serving General packet radio service (GPRS) Support Nodes (SGSN). The MMEs 120 manage mobility aspects in access such as gateway selection and tracking area list management. The EPC network 100 may comprise one or several MMEs 120

The SGW 130 terminates the interface toward an Evolved UMTS (Universal Mobile Telecommunications System) Terrestrial Radio Access Network (E-UTRAN), and routes data packets between the E-UTRAN and the EPC network 100. In addition, the SGW 130 may be a local mobility anchor point for inter-eNodeB handovers and also may provide an anchor for inter-3GPP mobility. Other responsibilities may include lawful intercept, charging, and some policy enforcement.

The PGW 140 terminates an SGi interface toward the PDN. The PGW 140 routes data packets between the EPC network 100 and external networks, and may be a node for policy enforcement and charging data collection. The PCRF 150 is the policy and charging control element of the EPC network 100. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 150 may be communicatively coupled to an application server (alternatively referred to as application function (AF)). Generally, the application server is an element offering applications that use Internet Protocol (IP) bearer resources with the core network (e.g., UMTS Packet Services (PS) domain, Long Term Evolution (LTE) PS data services, etc.). The application server may signal the PCRF 150 to indicate a new service flow and selecting the appropriate Quality of Service (QoS) and charging parameters. The PCRF 150 may provision this rule into a Policy and Charging Enforcement Function (PCEF) (not shown) with the appropriate traffic flow template (TFT) and QoS class of identifier (QCI), which commences the QoS and charging as specified by the application server.

The components of the EPC 100 may be implemented in one physical node or separate physical nodes. In some embodiments, Network Functions Virtualization (NFV) is utilized to virtualize any or all of the above described network node functions via executable instructions stored in one or more computer readable storage mediums (described in further detail below). A logical instantiation of the EPC network 100 may be referred to as a network slice 101. A logical instantiation of a portion of the EPC network 100 may be referred to as a network sub-slice 102 (e.g., the network sub-slice 102 is shown to include the PGW 140 and the PCRF 150).

Figure 2:
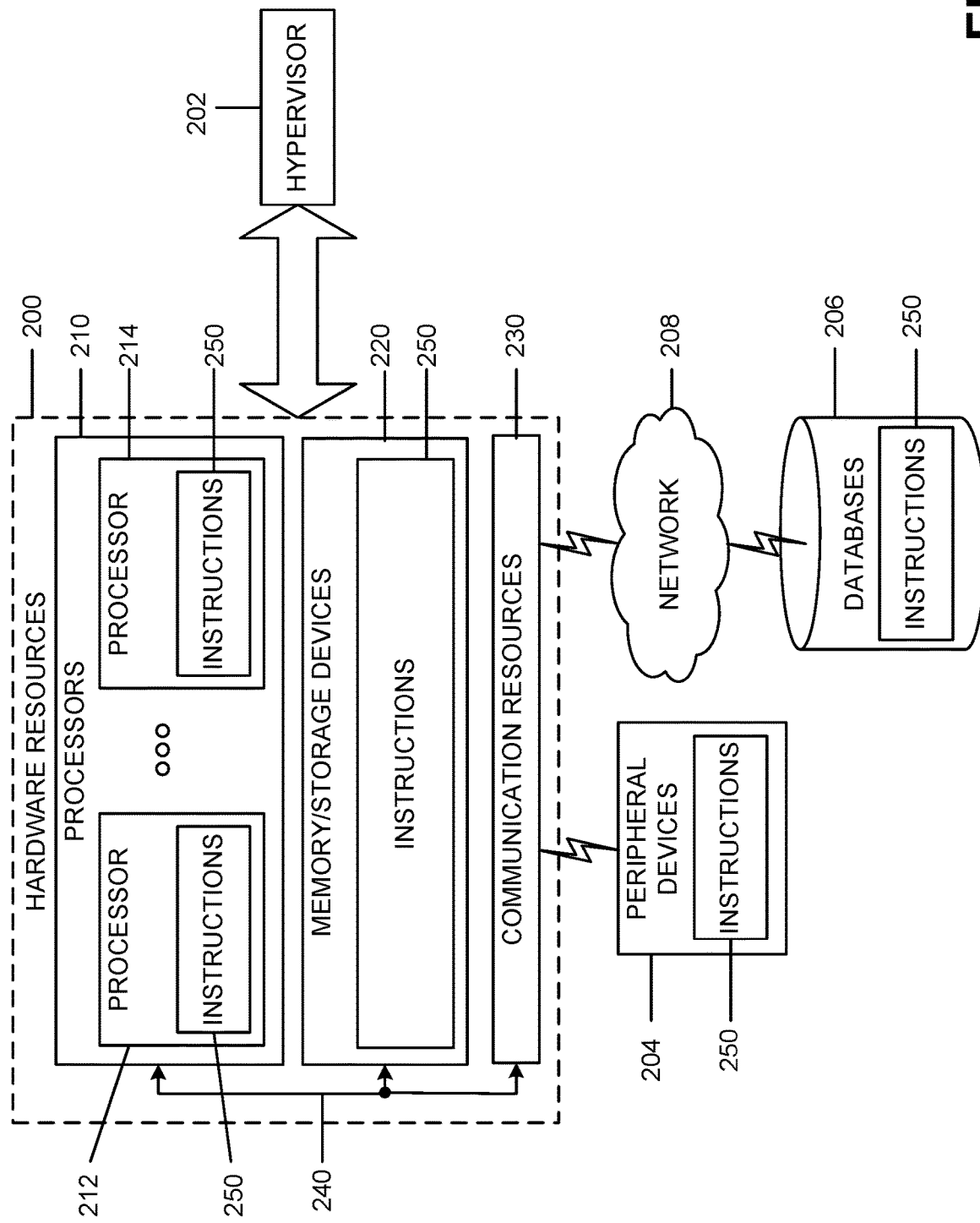
FIG. 2 is a block diagram illustrating components, according to some example embodiments, able to read instructions from a machine-readable or computer-readable medium (e.g., a machine-readable storage medium) and perform any one or more of the methodologies discussed herein.

FIG. 2 is a block diagram illustrating components, according to some example embodiments, able to read instructions from a machine-readable or computer-readable medium (e.g., a machine-readable storage medium) and perform any one or more of the methodologies discussed herein. Specifically, FIG. 2 shows a diagrammatic representation of hardware resources 200 including one or more processors (or processor cores) 210, one or more memory/storage devices 220, and one or more communication resources 230, each of which are communicatively coupled via a bus 240. For embodiments where node virtualization (e.g., NFV) is utilized, a hypervisor 202 may be executed to provide an execution environment for one or more network slices/sub-slices to utilize the hardware resources 200.

The processors 210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 212 and a processor 214. The memory/storage devices 220 may include main memory, disk storage, or any suitable combination thereof.

The communication resources 230 may include interconnection and/or network interface components or other suitable devices to communicate with one or more peripheral devices 204 and/or one or more databases 206 via a network 208. For example, the communication resources 230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 250 may comprise software, a program, an application, an applet, an app, or other executable code for causing at least any of the processors 210 to perform any one or more of the methodologies discussed herein. The instructions 250 may reside, completely or partially, within at least one of the processors 210 (e.g., within the processor's cache memory), the memory/storage devices 220, or any suitable combination thereof. Furthermore, any portion of the instructions 250 may be transferred to the hardware resources 200 from any combination of the peripheral devices 204 and/or the databases 206. Accordingly, the memory of processors 210, the memory/storage devices 220, the peripheral devices 204, and the databases 206 are examples of computer-readable and machine-readable media.

In various embodiments, techniques described herein can be employed to facilitate end-to-end creation of threshold(s) in connection with a VNF related virtualization resource (VR) performance measurement (PM), and/or to generate a notification of a crossing of such a threshold.

To insure that the VNF(s) (virtual network function(s)) deployed on the NFV (network function virtualization) infrastructure (NFVI) are able to deliver a consistent and acceptable service quality to end users, as well as to isolate and correct failure conditions in the most timely manner, virtualized resource (VR) performance measurements (PMs) can be employed. These performance measurements can reflect the way VNFs are impacted by the NFVI services, and the inherent nature of the services being offered by the NFVI, for example, CPU (Central Processing Unit), Virtual Machines, memory, and Virtual Networks. Therefore, the NFV performance measurements can be measured in VNF and NFVI.

However, to identify a possible issue from performance data, conventionally operators first collect performance data for days, weeks, or even months, and then sift through tons of data, which may be time consuming and costly due to the processing power involved. Even though these conventional techniques can finally find a problem from the PM data mining, it may be too late for mitigation, since the network traffic fluctuates dynamically. In various aspects discussed herein, threshold(s) can be set on PM counter(s), which can allow operator(s) to receive notification(s) when the counter crossed the threshold. As the result, techniques discussed herein can reduce the amount of PM data to be collected, and enable operator to act promptly when the PM counter crosses the threshold, which indicates an event or issue needs attention.

In various embodiments discussed herein, end-to-end techniques, covering NM, EM, VNFM, VIM, and NFVI, can be employed to enable the Network Manager (NM) to first set a threshold to monitor a PM counter at the Ceilometer (or other data collection service) in the NFVI, and receive a notification when the counter has crossed the pre-defined threshold.

Figure 3:
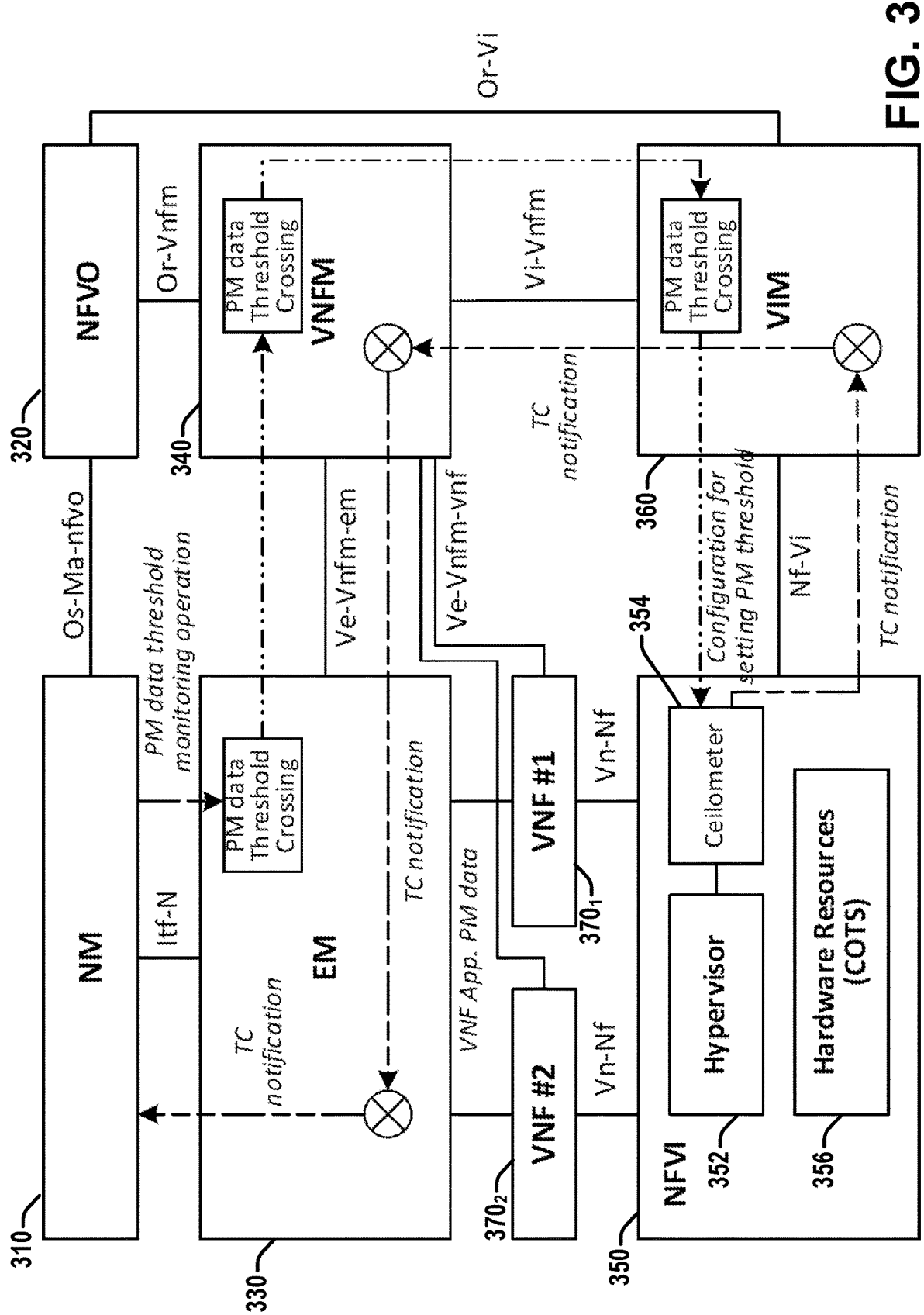
FIG. 3 is a diagram of an architecture that facilitates VR (Virtualization Resource) PM (Performance Measurement) threshold creation and/or TC (Threshold Crossing) notification according to various aspects described herein.

Referring to FIG. 3, illustrated is a diagram of an architecture that facilitates VR performance measurement threshold creation and/or threshold crossing notification according to various aspects described herein. In FIG. 3, an example virtual network function (VNF) performance measurement (PM) threshold creation flow (and optional subsequent notification of threshold crossing) that can be employed in connection with various aspects described is illustrated, along with a threshold crossing notification flow. The system illustrated in FIG. 3 comprises a Network Manager (NM) 310, Network Function Virtualization (NFV) Orchestrator (NFVO) 320, network Element Manager (EM) 330, a set of Virtualized Network Functions (VNFs) $370_i$ that are running on Virtualization Resources (VRs) of a NFV Infrastructure (NFVI) 350 (which can comprise a hypervisor 352 such as hypervisor 202, ceilometer (or other data collection service) 354, and hardware resources 356 such as hardware resources 200), a VNF Manager (VNFM) 340, and a Virtualized Infrastructure Manager (VIM) 360. The solid lines between these entities indicate the various reference points that facilitate data exchange between these entities, the dashed and dotted lines indicates the flow of data associated with threshold creation, and the dashed lines indicate the flow of data associated with the notification of threshold crossing.

After a PM job has been created to collect VNF PM data related to a Virtualized Resource (VR), the NM can send a request to the EM to set a threshold for monitoring the PM data. Since the PM data to be monitored is related to the VR, the EM can send a request to the VNFM to set the threshold for monitoring the PM data. Then, the VNFM can send a request to VIM to set the threshold for monitoring the PM data. The VIM then can create a threshold at the Ceilometer (or other data collection service) in the NFVI to monitor the VR PM data.

When the Ceilometer (or other data collection service) detects that the PM data counter has crossed the threshold, it can send a Threshold Crossing (TC) notification to VIM. If the TC notification has been subscribed, VIM then can send the TC notification to VNFM that can forward the TC notification to EM. EM can send the TC notification to NM.

In various aspects, techniques discussed herein can be employed in connection with end-to-end threshold creation in connection with a VNF related VR PM job, and associated actions that can be performed by an NM, EM, VNFM, VIM, and/or NFVI in connection with such threshold creation.

Figure 4:
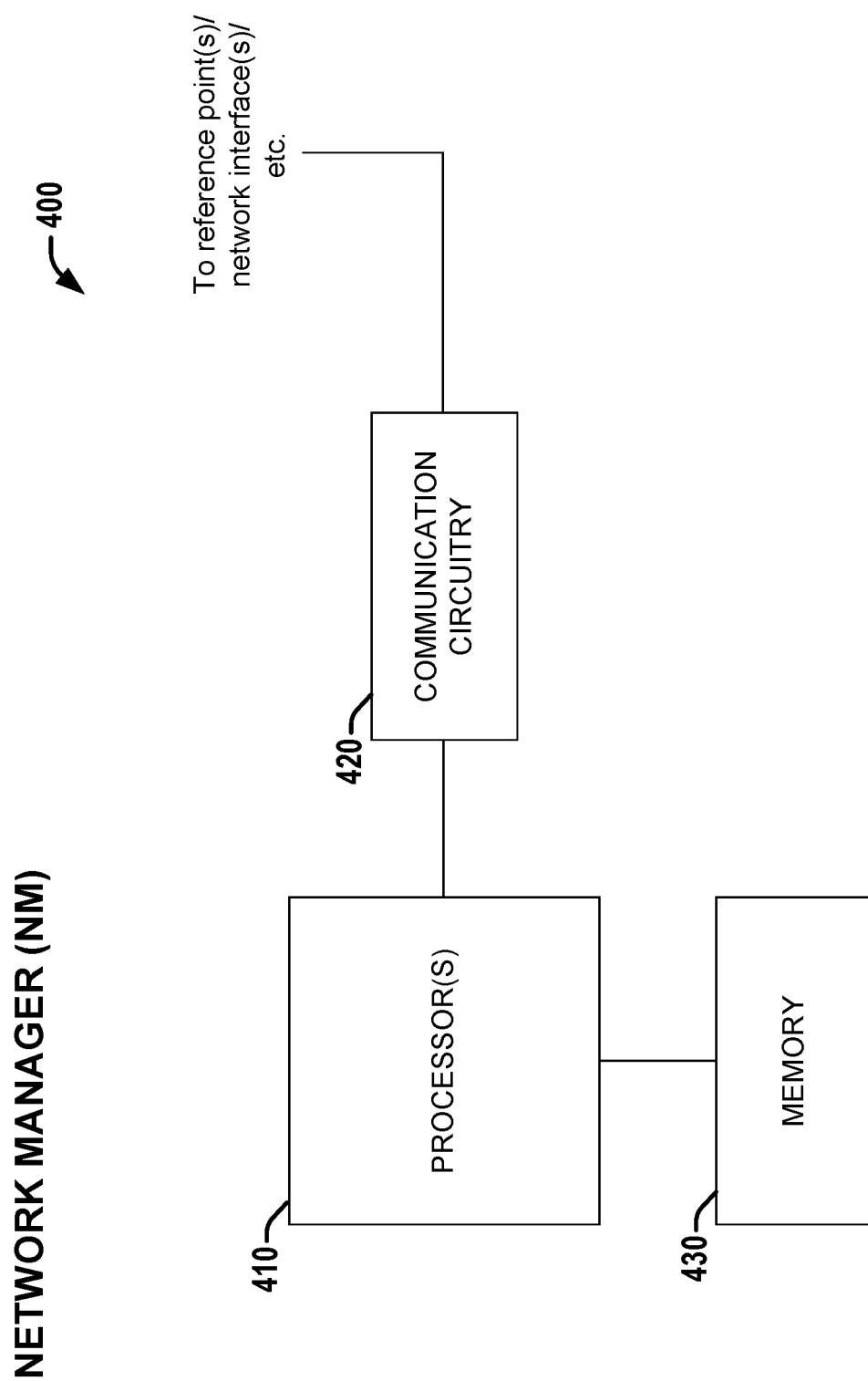
FIG. 4 is a block diagram of a system employable by a Network Manager (NM) that facilitates threshold creation and associated operations in connection with a VNF (Virtual Network Function) related VR PM, according to various aspects described herein.

Referring to FIG. 4, illustrated is a block diagram of a system 400 employable by a Network Manager (NM) that facilitates threshold creation and associated operations in connection with a VNF related VR PM, according to various aspects described herein. System 400 can comprise one or more processors 410 (e.g., which can comprise one or more of processor(s) 210, etc.), communication circuitry 420 (which can facilitate communication of data via one or more reference points, networks, etc., and can comprise communication resource(s) 230, etc.), and memory 430 (which can comprise any of a variety of storage mediums and can store instructions and/or data associated with at least one of the one or more processors 410 or communication circuitry 420, and can comprise memory/storage device(s) 220 and/or cache memory of processor(s) 410, etc.). In some aspects, the one or more processors 410, the communication circuitry 420, and the memory 430 can be included in a single device, while in other aspects, they can be included in different devices, such as part of a distributed architecture. As described in greater detail below, system 400 can be employed by a NM to perform one or more operations (e.g., those described herein in connection with FIGS. 9 and 10)

that can facilitate end-to-end creation of a threshold in connection with a VNF related VR PM.

Figure 5:
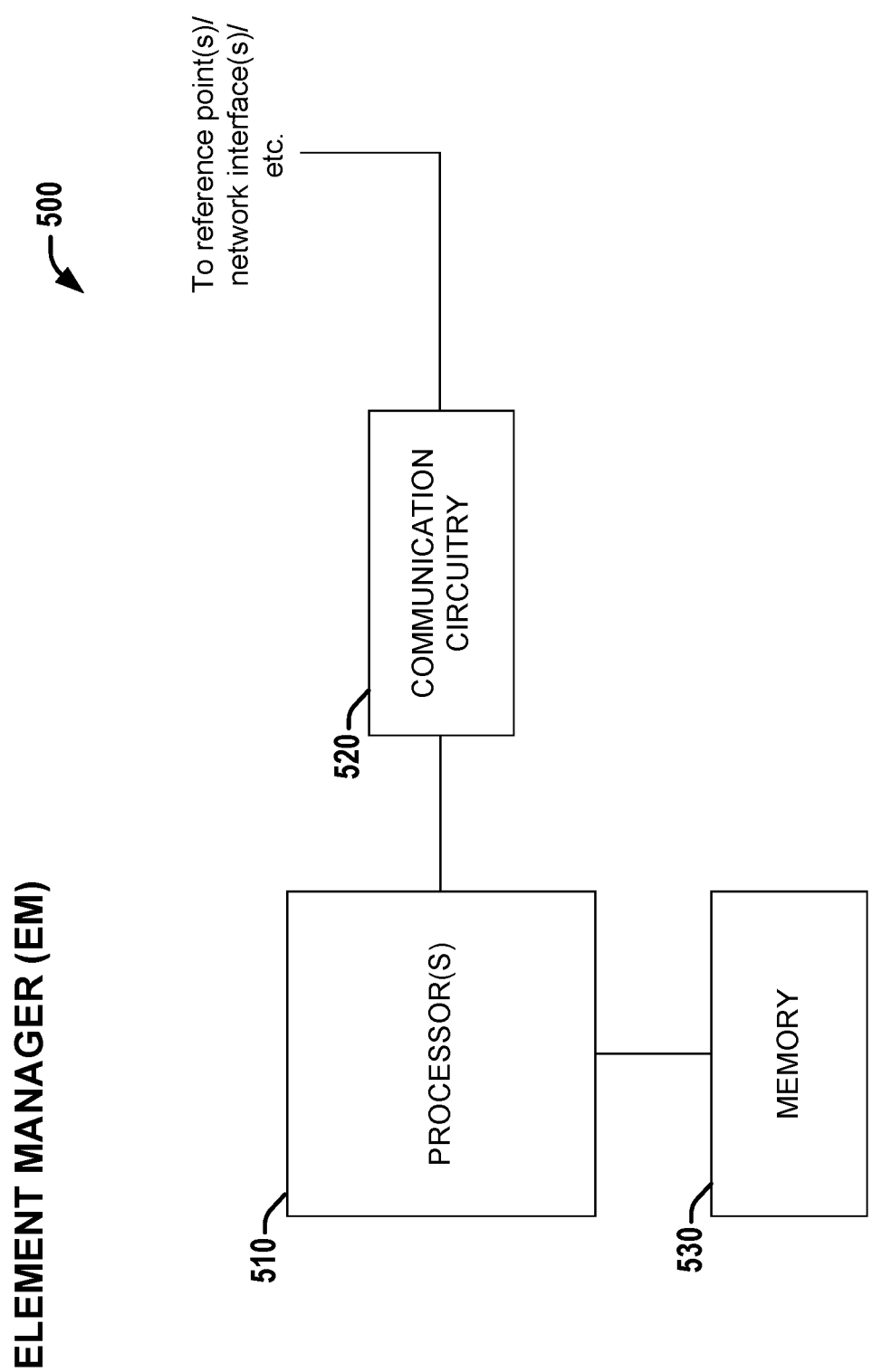
FIG. 5 is a block diagram of a system employable by an Element Manager (EM) that facilitates threshold creation and associated operations in connection with a VNF related VR PM, according to various aspects described herein.

Referring to FIG. 5, illustrated is a block diagram of a system 500 employable by an Element Manager (EM) that facilitates threshold creation and associated operations in connection with a VNF related VR PM, according to various aspects described herein. System 500 can comprise one or more processors 510 (e.g., which can comprise one or more of processor(s) 210, etc.), communication circuitry 520 (which can facilitate communication of data via one or more reference points, networks, etc., and can comprise communication resource(s) 230, etc.), and memory 530 (which can comprise any of a variety of storage mediums and can store instructions and/or data associated with at least one of the one or more processors 510 or communication circuitry 520, and can comprise memory/storage device(s) 220 and/or cache memory of processor(s) 510, etc.). In some aspects, the one or more processors 510, the communication circuitry 520, and the memory 530 can be included in a single device, while in other aspects, they can be included in different devices, such as part of a distributed architecture. As described in greater detail below, system 500 can be employed by an EM to perform one or more operations (e.g., those described herein in connection with FIGS. 9 and 11) that can facilitate end-to-end creation of a threshold in connection with a VNF related VR PM.

Figure 6:
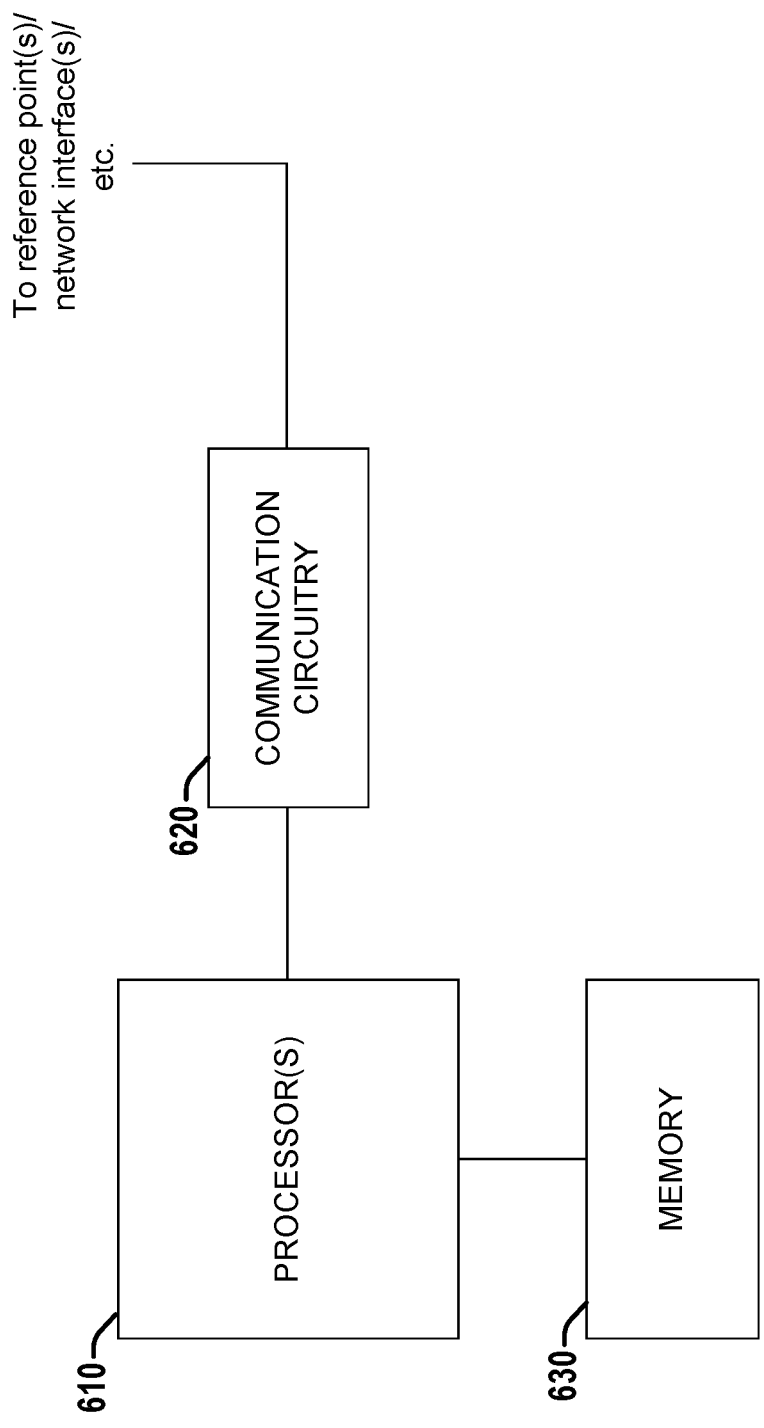
FIG. 6 is a block diagram of a system employable by a Virtual Network Function Manager (VNFM) that facilitates threshold creation and associated operations in connection with a VNF related VR PM, according to various aspects described herein.

Referring to FIG. 6, illustrated is a block diagram of a system 600 employable by a Virtual Network Function Manager (VNFM) that facilitates threshold creation and associated operations in connection with a VNF related VR PM, according to various aspects described herein. System 600 can comprise one or more processors 610 (e.g., which can comprise one or more of processor(s) 210, etc.), communication circuitry 620 (which can facilitate communication of data via one or more reference points, networks, etc., and can comprise communication resource(s) 230, etc.), and memory 630 (which can comprise any of a variety of storage mediums and can store instructions and/or data associated with at least one of the one or more processors 610 or communication circuitry 620, and can comprise memory/storage device(s) 220 and/or cache memory of processor(s) 610, etc.). In some aspects, the one or more processors 610, the communication circuitry 620, and the memory 630 can be included in a single device, while in other aspects, they can be included in different devices, such as part of a distributed architecture. As described in greater detail below, system 600 can be employed by a VNFM to perform one or more operations (e.g., those described herein in connection with FIGS. 9 and 12) that can facilitate end-to-end creation of a threshold in connection with a VNF related VR PM.

Figure 7:
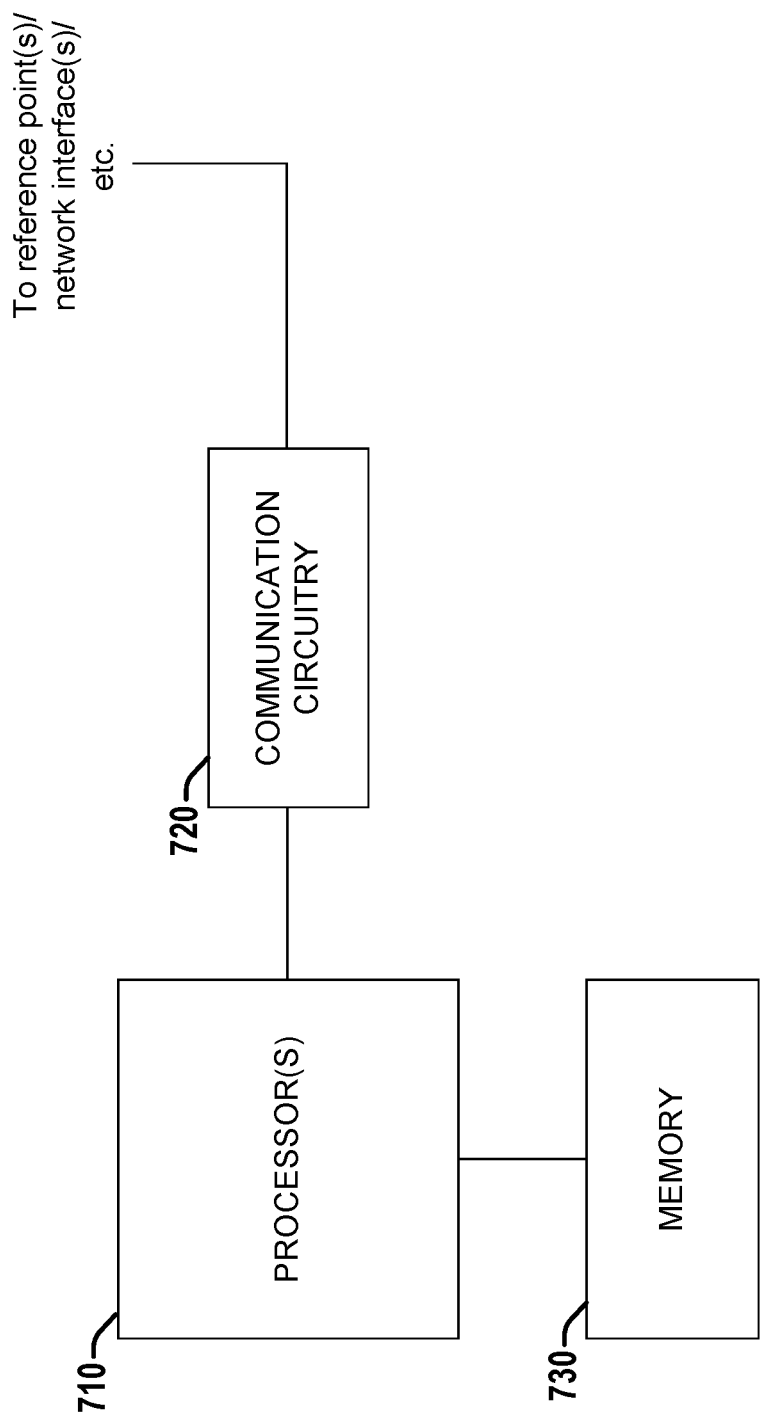
FIG. 7 is a block diagram of a system employable by a Virtualized Infrastructure Manager (VIM) that facilitates threshold creation and associated operations in connection with a VNF related VR PM, according to various aspects described herein.

Referring to FIG. 7, illustrated is a block diagram of a system 700 employable by a Virtualized Infrastructure Manager (VIM) that facilitates threshold creation and associated operations in connection with a VNF related VR PM, according to various aspects described herein. System 700 can comprise one or more processors 710 (e.g., which can comprise one or more of processor(s) 210, etc.), communication circuitry 720 (which can facilitate communication of data via one or more reference points, networks, etc., and can comprise communication resource(s) 230, etc.), and memory 730 (which can comprise any of a variety of storage mediums and can store instructions and/or data associated with at least one of the one or more processors 710 or communication circuitry 720, and can comprise memory/storage device(s) 220 and/or cache memory of processor(s) 710, etc.). In some aspects, the one or more processors 710, the communication circuitry 720, and the memory 730 can be included in a single device, while in other aspects, they can be included in different devices, such as part of a distributed architecture. As described in greater detail below, system 700 can be employed by a VIM to perform one or more operations (e.g., those described herein in connection with FIGS. 9 and 13) that can facilitate end-to-end creation of a threshold in connection with a VNF related VR PM.

Figure 8:
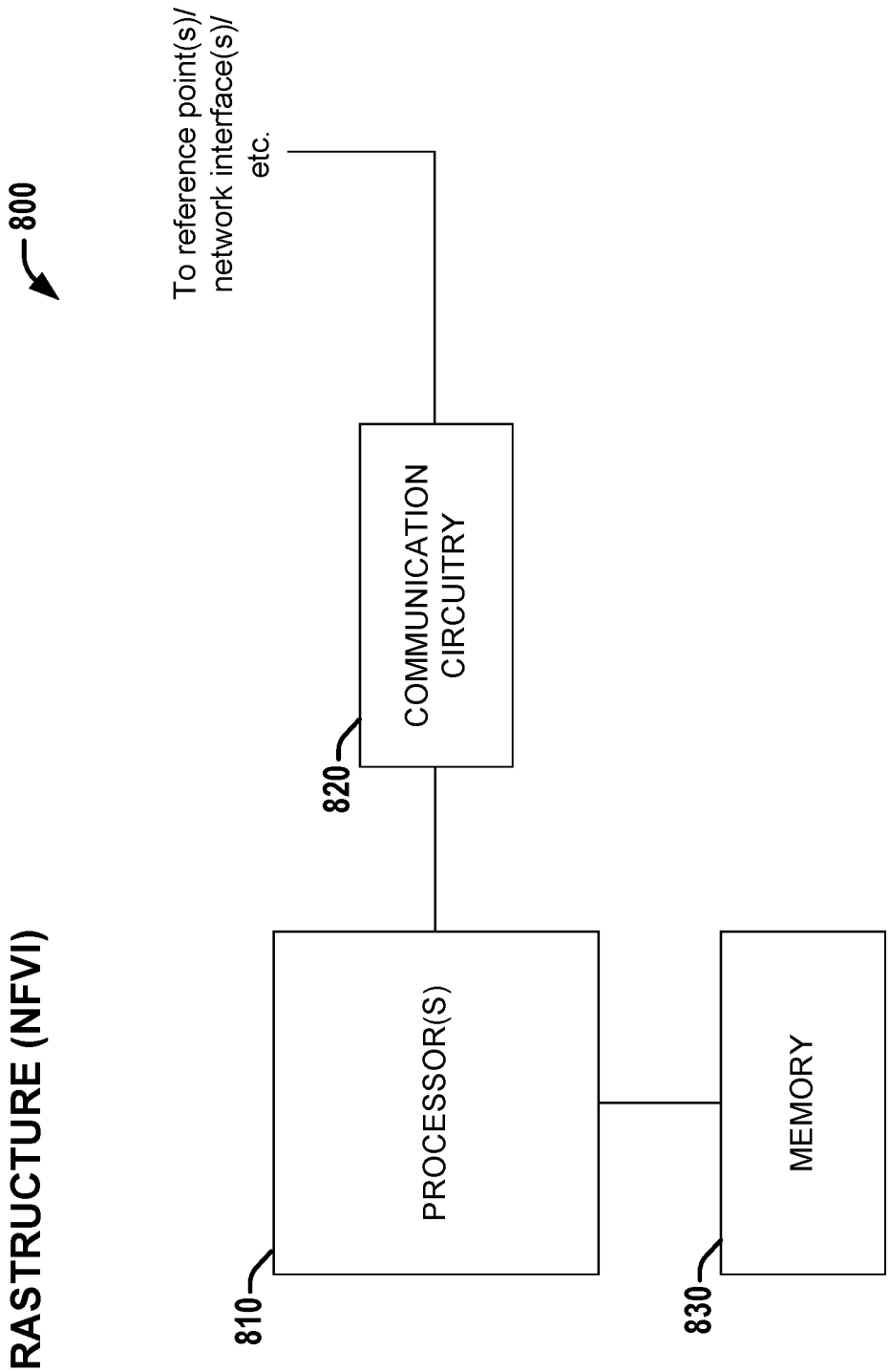
FIG. 8 is a block diagram of a system employable by a Network Function Virtualization Infrastructure (NFVI) that facilitates threshold creation and associated operations in connection with a VNF related VR PM, according to various aspects described herein.

Referring to FIG. 8, illustrated is a block diagram of a system 800 employable by a Network Function Virtualization Infrastructure (NFVI) that facilitates threshold creation and associated operations in connection with a VNF related VR PM, according to various aspects described herein. System 800 can comprise one or more processors 810 (e.g., which can comprise one or more of processor(s) 210, etc.), communication circuitry 820 (which can facilitate communication of data via one or more reference points, networks, etc., and can comprise communication resource(s) 230, etc.), and memory 830 (which can comprise any of a variety of storage mediums and can store instructions and/or data associated with at least one of the one or more processors 810 or communication circuitry 820, and can comprise memory/storage device(s) 220 and/or cache memory of processor(s) 810, etc.). In some aspects, the one or more processors 810, the communication circuitry 820, and the memory 830 can be included in a single device, while in other aspects, they can be included in different devices, such as part of a distributed architecture. As described in greater detail below, system 600 can be employed by a NFVI to perform one or more operations (e.g., those described herein in connection with FIGS. 9 and 14) that can facilitate end-to-end creation of a threshold in connection with a VNF related VR PM.

Figure 9:
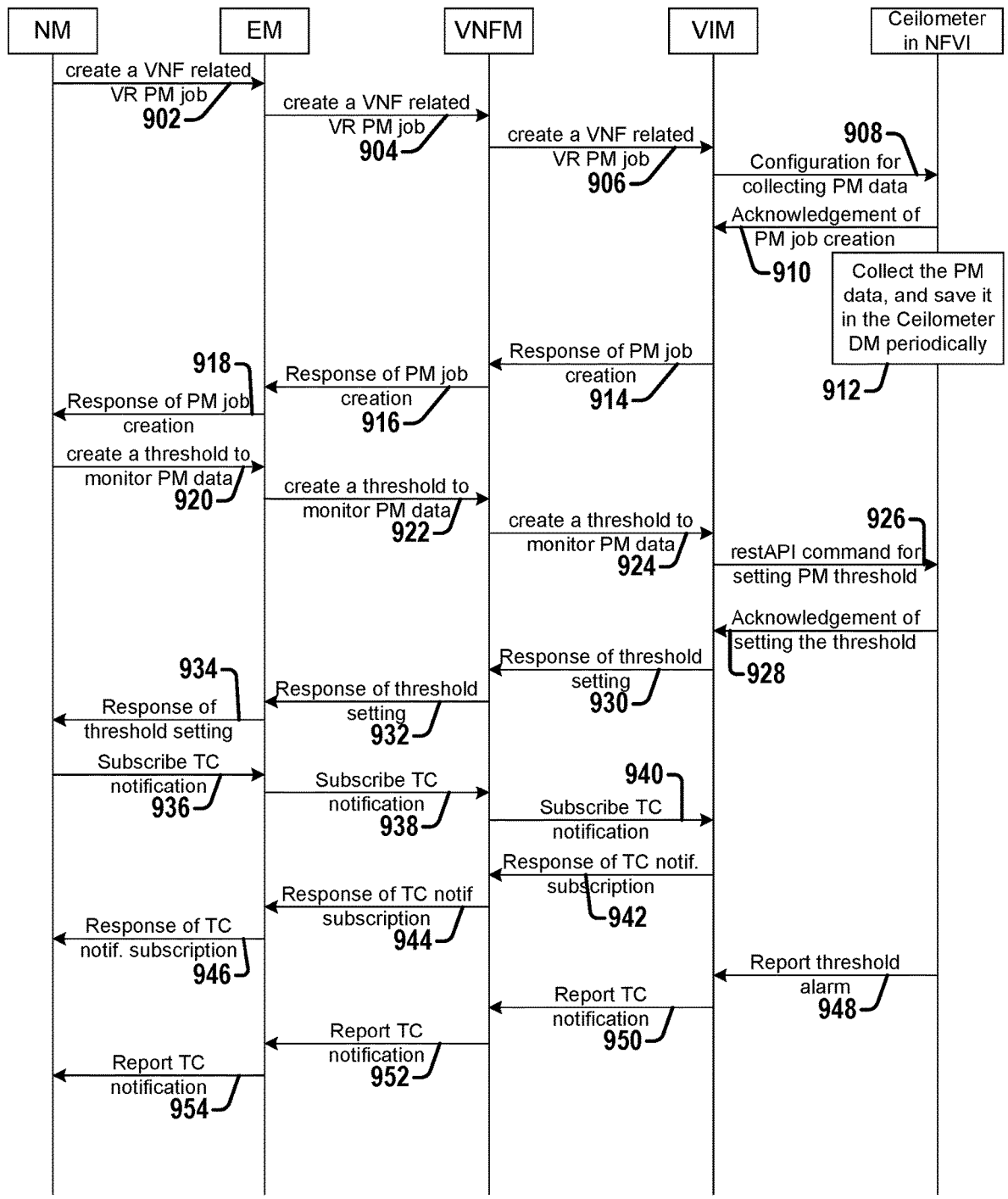
FIG. 9 is a flow diagram of a method that facilitates a threshold being created to monitor VR performance measurements and a notification being generated when the threshold crossing or performance alarm is detected, according to various aspects described herein.

Referring to FIG. 9, illustrated is a flow diagram showing an example method that facilitates a threshold being created to monitor VR performance measurements and a notification being generated when the threshold crossing or performance alarm is detected, according to various aspects described herein. In various aspects, techniques described herein can be employed to perform threshold monitoring operations (e.g., threshold creation, deletion, listing, etc.), and to notify an NM and/or operator of such thresholds being crossed. The flow in FIG. 9 shows an example scenario involving creation and subsequent triggering of a threshold. Acts 1-9 relate to creation of a VR PM job and associated data collection. Acts 10-17 relate to creation of a threshold to monitor the PM data. Acts 18-23 relate to subscribing to a threshold crossing notification. Acts 24-27 relate to reporting a threshold crossing associated with a subscription.

At 902, NM can send (e.g., via communication circuitry 420) a request (e.g., generated by processor(s) 410) to EM (e.g., via the Itf-N reference point) to create a measurement job to collect the VNF related VR PM data. The job (e.g., as generated by processor(s) 410) can be defined by parameters such as the following: (a) iOCName (information object class (IOC) name, which can specify one Managed Entity class name) and iOCInstanceList (IOC instance list, which can specify the list of DNs of ManagedEntity instances whose measurementType(s) are to be collected), which can be object identifiers that can identify the VNF and VM where the measurements are to be collected; (b) measurementCategoryList (measurement category list), which can include the MeasuredAttribute (which can represent the name of the measurementType of the related ManagedEntity instance whose value is to be monitored and collected) and MeasurementTypeName (which can identify a name of one measurement type whose value is being collected and monitored) IOCs that can define the type of measurement(s) to be collected (e.g., Mean CPU Usage, Peak Memory Usage, Number of Octets of Outgoing IP Packets, Number of Outgoing IP Packets, etc.); (c) granularityPeriod (granularity period, which can specify the period between two successive measurements or readings of a threshold value), which can define the granularity interval for the measurements; and (d) reportingPeriod (reporting period, which can specify the period between two successive notifications, such as of a file being ready, or an error in file preparation), which can define the reporting interval for the measurements. The EM can receive this request via communication circuitry 520 and process this request via processor(s) 510.

At 904, the EM (e.g., via processor(s) 510) can use the iOCName and iOCInstanceList to identify the list of VNF instances where the PM job is to be created, and can send (e.g., via communication circuitry 520) a request (e.g., generated by processor(s) 510) with parameters such as the following to the corresponding VNFM (e.g., via the Ve-Vnfm-em reference point) to create a PM job: (a) source-Selector (source selector), which can identifies the VNF and VM where the measurements are to be collected, and can be mapped from iOCName, iOCInstanceList; (b) performance-Metric: (performance metric), which can identify the type of measurements to be collected (e.g., Mean CPU Usage, Peak Memory Usage, Number of Octets of Outgoing IP Packets, Number of Outgoing IP Packets, etc.), and can be mapped from measurementCategoryList; (c) collectionPeriod (collection period), which can be mapped from granularityPeriod; and (d) reportingPeriod (reporting period), which can be mapped from the reportingPeriod of the request sent from the NM. The VNFM can receive this request via communication circuitry 620 and process this request via processor(s) 610.

At 906, the VNFM can send (e.g., via communication circuitry 620) a request (e.g., generated by processor(s) 610) to the VIM (e.g., via the Vi-Vnfm reference point) to create a PM job to collect the VR performance measurements (e.g., a VNF related VR PM job). The VIM can receive this request via communication circuitry 720 and process this request via processor(s) 710.

At 908, VIM can send (e.g., via communication circuitry 720) one or more configuration files (e.g., a pipeline.yaml Ceilometer configuration file, for example, generated by processor(s) 710) to a data collection service (e.g., Ceilometer) in the NFVI (e.g., via the Nf-Vi reference point) to configure the collection of one or more PM measurements (e.g., Mean CPU usage, etc.). The NFVI can receive the configuration file(s) via communication circuitry 820 and process the configuration file(s) via processor(s) 810 (e.g., by creating one or more VNF related VR PM jobs to collect the one or more PM measurements). The configuration file(s) (e.g., pipeline.yaml) of the data collection service (e.g., Ceilometer) can include configuration files for collecting mean and/or peak CPU usage (e.g., Vcpu_util, etc.), memory usage (e.g., Mem_util, etc.), and/or incoming/outgoing IP traffic (e.g., Packet_util, etc.). The following is an example of a pipeline.yaml Ceilometer configuration file for collecting the Mean CPU usage (e.g., Vcpu_util) that can be employed in various aspects discussed herein:

```
--- Vcpu_util
sources:
  - name: cpu_source
    interval: 30
    meters:
    - "cpu"
```

-continued

```
    sinks:
    - cpu_sink
    - vcpu_sink
  - name: vcpu_sink
    transformers:
    - name: "rate_of_change"
      parameters:
        target:
          name: "vcpu_util"
          unit: "%"
          type: "gauge"
          scale: "100.0 / (10**9 * (resource_metadata.
vcpu_number or 1))" publishers:
    - notifier://
```

At 910, the data collection service (e.g., Ceilometer) in the NFVI can send (e.g., via communication circuitry 820) an acknowledgement (e.g., generated by processor(s) 810) to the VIM (e.g., via the Nf-Vi reference point), which can indicate, for example, a start and/or completion of configuration of the collection of one or more PM measurements (e.g., a start and/or completion of creation of the one or more VNF related VR PM jobs). The VIM can receive this acknowledgement via communication circuitry 720 and process this acknowledgement via processor(s) 710.

At 912, after the data collection service (e.g., Ceilometer) configuration file(s) (pipeline.yaml configuration file) has/have been successfully loaded (e.g., into memory 830 by processor(s) 810), the data collection service (e.g., Ceilometer) in the NFVI can collect (e.g., via processor(s) 810) VR PM data periodically at the interval defined in the PM job and save it (e.g., via processor(s) 810) in a data collection service (e.g., Ceilometer) Database (e.g., stored in memory 830).

At 914, the VIM can send (e.g., via communication circuitry 720) a response (e.g., generated by processor(s) 710) to the VNFM (e.g., via the Vi-Vnfm reference point) with the PM job identifier (e.g., via a pmJobId parameter that can identify the PM job (being created, deleted, etc.), etc.). The VNFM can receive this response via communication circuitry 620 and process this response via processor(s) 610.

At 916, the VNFM can send (e.g., via communication circuitry 620) a response (e.g., generated by processor(s) 610) to the EM (e.g., via the Ve-Vnfm-em reference point) with the identifier of the PM job being created. The EM can receive this response via communication circuitry 520 and process this response via processor(s) 510.

At 918, the EM can send (e.g., via communication circuitry 520) a response (e.g., generated by processor(s) 510) to the NM (e.g., via the Itf-N reference point) with a jobId (job identifier) that can be mapped from the pmJobId, along with a status (e.g., wherein status='Success'). The NM can receive this response via communication circuitry 420 and process this response via processor(s) 410.

At 920, the NM can send (e.g., via communication circuitry 420) a request (e.g., generated by processor(s) 410) to the EM (e.g., via the Itf-N reference point) to create one or more thresholds that can be defined by parameters, such as iOCName (information object class (IOC) name), iOCInstanceList (IOC instance list), thresholdInfoList (threshold information list, which can specify threshold(s) to specific type(s) of performance measurements (e.g., via one or more measurementTypes)), etc., to monitor VNF related VR performance measurements. The EM can receive this request via communication circuitry 520 and process this request via processor(s) 510.

At 922, the EM can send (e.g., via communication circuitry 520) a request (e.g., generated by processor(s) 510) to VNFM (e.g., via the Ve-Vnfm-em reference point) to create threshold(s) for monitoring measurement type(s), wherein the request can comprise parameters which can specify the measurement type(s) and threshold(s), such as sourceSelector (source selector, which can define the resources for which performance information is requested to be collected), performanceMetric (performance metric, which can define the type of performance metric(s) for the specified resources), thresholdType (threshold type, which can define the type of threshold, such as single/multi valued threshold, static/dynamic threshold, template based threshold, etc.), thresholdDetails (threshold details, which can indicate details of the threshold, such as value(s) to be crossed, direction in which it is crossed, and/or details on the notification to be generated when crossed), to create the threshold(s) for monitoring the measurement type(s) specified in the request (e.g., via sourceSelector, etc.). The VNFM can receive this request via communication circuitry 620 and process this request via processor(s) 610.

At 924, the VNFM can send (e.g., via communication circuitry 620) a request (e.g., generated by processor(s) 610) to the VIM (e.g. via the Nf-Vi reference point) which can specify the measurement type(s) and threshold(s) indicated in the request to create threshold(s) sent from the EM to VNFM (e.g., via parameters such as sourceSelector, performanceMetric, thresholdType, thresholdDetails, etc.) to create the threshold(s) for monitoring the measurement type(s) specified in the request (e.g., via sourceSelector, etc.). The VIM can receive this request via communication circuitry 720 and process this request via processor(s) 710.

At 926, the VIM can send (e.g., via communication circuitry 720, over the Nf-Vi reference point) a command (e.g., a restAPI (Representation State Transfer Application Programming Interface) command such as discussed herein), which can be generated by processor(s) 710, to create the alarm threshold at the data collection service (e.g., Ceilometer) of the NFVI (e.g., via processor(s) 810 implementing the command). The NFVI can receive this command via communication circuitry 820 and process this command via processor(s) 810. The following is an example restAPI command that can be employed in various aspects:

```
curl -g -i -X 'POST' 'http://192.168.204.2:8777/v2/alarms'
-H 'User-Agent:
    ceilometerclient.openstack.common.apiclient' -H
    'Content-Type: application/json' H 'X-Auth-Token:
    {SHA1}2bc43bf285ee939f4678fdb3e31b080be9670722'
DEBUG (client) REQ BODY: {"alarm_actions": ["http://
127.0.0.1:
8080/"], "name":
    "cpu_util_high", "enabled": true, "threshold_rule":
    {"meter_name": "cpu_util", "evaluation_periods":
    1, "period": 60, "statistic": "max", "threshold": 30.0,
    "comparison_operator": "gt"}, "repeat_actions": true,
    "type": "threshold"}
```

At 928, the data collection service (e.g., Ceilometer) in the NFVI can send (e.g., via communication circuitry 820) an acknowledgement (e.g., generated by processor(s) 810), which can indicate a start and/or completion of the command, to the VIM (e.g., via the Nf-Vi reference point). The VIM can receive this acknowledgement via communication circuitry 720 and process this acknowledgement via processor(s) 710.

At 930, the VIM can send (e.g., via communication circuitry 720) a response (e.g., generated by processor(s) 710) to VNFM (e.g., via the Vi-Vnfm reference point) indicating (e.g., via thresholdId (threshold identifier, which can identify the created threshold(s)) parameter(s)) the identifier(s) of the threshold(s) that have been created. The VNFM can receive this response via communication circuitry 620 and process this response via processor(s) 610.

At 932, the VNFM can send (e.g., via communication circuitry 620) a response (e.g., generated by processor(s) 610) to the EM (e.g., via the Ve-Vnfm-em reference point) indicating (e.g., via thresholdId parameter(s)) the identifier(s) of the threshold(s) that have been created. The EM can receive this response via communication circuitry 520 and process this response via processor(s) 510.

At 934, the EM can send (e.g., via communication circuitry 520) a response (e.g., generated by processor(s) 510) to NM (e.g., via the Itf-N reference point) identifying the threshold monitoring instance(s) were successfully created (e.g., via monitorId (monitor identifier) attribute(s), which can identify the monitored threshold instance(s), and a status (e.g., equal to 'Success') attribute for each threshold). The NM can receive this response via communication circuitry 420 and process this response via processor(s) 410.

At 936, the NM can send (e.g., via communication circuitry 420) a request (e.g., generated by processor(s) 410) to the EM (e.g., via the Itf-N reference point) to subscribe the TC (threshold crossing) notification. The EM can receive this request via communication circuitry 520 and process this request via processor(s) 510.

At 938, the EM can send (e.g., via communication circuitry 520) a request (e.g., generated by processor(s) 510) with a filter parameter (e.g., an input filter that can be used for selecting notifications, such as on resource (such as VNF/VNFC (VNF Component)), type of notification, attribute of the notification, etc.) to VNFM (e.g., via the Ve-Vnfm-em reference point) to subscribe to the TC notification. The VNFM can receive this request via communication circuitry 620 and process this request via processor(s) 610.

At 940, the VNFM can send (e.g., via communication circuitry 620) a request (e.g., generated by processor(s) 610) with a filter parameter to the VIM (e.g., via the Vi-Vnfm reference point) to subscribe to the TC notification. The VIM can receive this request via communication circuitry 720 and process this request via processor(s) 710, and can generate (e.g., via processor(s) 710) the indicated subscription to the TC notification.

At 942, the VIM can send (e.g., via communication circuitry 720) a response (e.g., generated by processor(s) 710) with a subscriptionId (subscription identifier, which can identify the subscription realized) parameter to the VNFM (e.g., via the Vi-Vnfm reference point) to indicate the TC notification subscription. The VNFM can receive this response via communication circuitry 620 and process this response via processor(s) 610.

At 944, the VNFM can send (e.g., via communication circuitry 620) a response (e.g., generated by processor(s) 610) with the subscriptionId parameter to the EM (e.g., via the Ve-Vnfm-em reference point) to indicate the TC notification that has been subscribed. The EM can receive this response via communication circuitry 520 and process this response via processor(s) 510.

At 946, the EM can send (e.g., via communication circuitry 520) a response (e.g., generated by processor(s) 510) to the NM (e.g., via the Itf-N reference point) to indicate that the TC notification has been subscribed. The NM can receive this response via communication circuitry 420 and process this response via processor(s) 410.

At 948, the data collection service (e.g., Ceilometer) at the NFVI can detect (e.g., via processor(s) 810) a threshold crossing and can report (e.g., via communication circuitry 820) the threshold alarm (e.g., generated by processor(s) 810) to VIM (e.g., via the Nf-Vi reference point). The VIM can receive this reported threshold alarm via communication circuitry 720 and process this reported threshold alarm via processor(s) 710.

At 950, the VIM can send (e.g., via communication circuitry 720) the TC notification (e.g., generated by processor(s) 710) to the VNFM (e.g., via the Vi-Vnfm reference point). The VNFM can receive this TC notification via communication circuitry 620 and process this TC notification via processor(s) 610.

At 952, the VNFM can send (e.g., via communication circuitry 620) the TC notification (e.g., generated by processor(s) 610) to the EM (e.g., via the Ve-Vnfm-em reference point). The EM can receive this TC notification via communication circuitry 520 and process this TC notification via processor(s) 510.

At 954, the EM can send (e.g., via communication circuitry 520) the TC notification (e.g., generated by processor(s) 510) to the NM (e.g., via the Itf-N reference point). The NM can receive this TC notification via communication circuitry 420 and process this TC notification via processor(s) 410.

Figure 10:
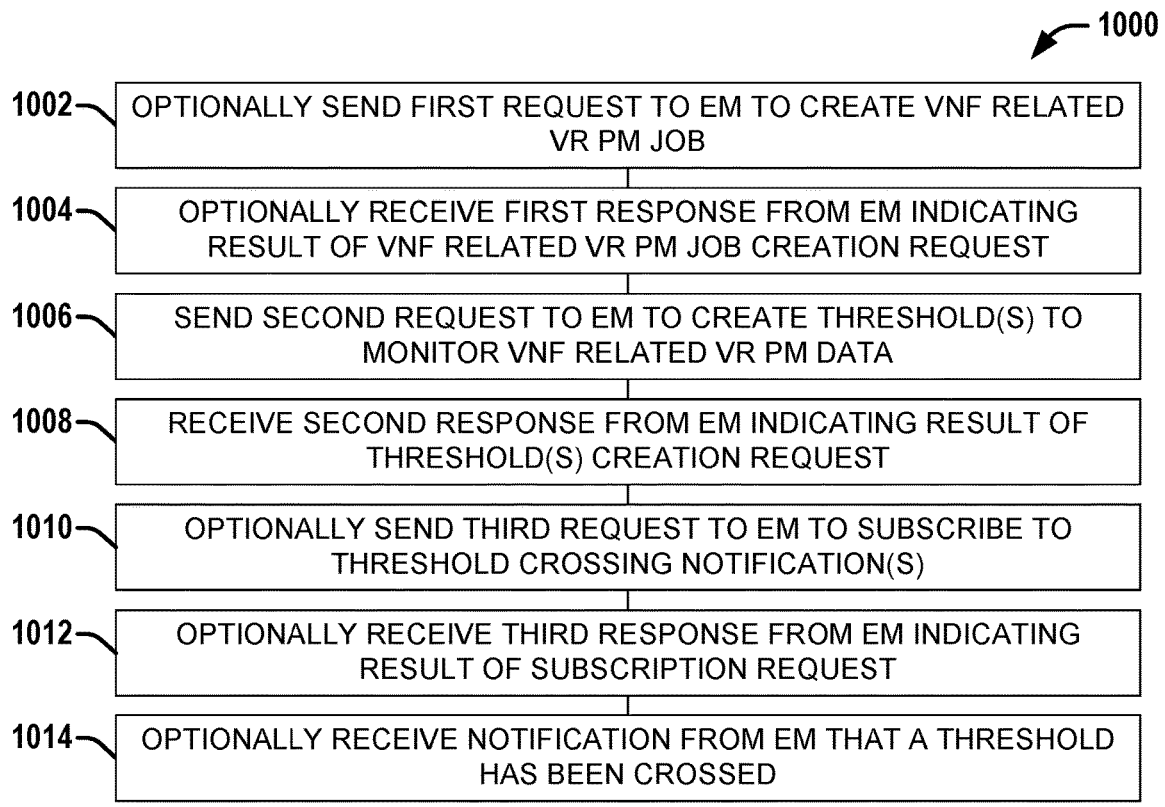
FIG. 10 is a flow diagram of a method that facilitates threshold creation and associated operations by a NM according to various aspects described herein.

Referring to FIG. 10, illustrated is a flow diagram of a method 1000 that facilitates threshold creation and associated operations by a NM according to various aspects described herein. In some aspects, method 1000 can be performed at a NM. In other aspects, a machine readable medium can store instructions associated with method 1000 that, when executed, can cause a NM to perform the acts of method 1000.

At 1002, a first request can be sent to an EM to create a VNF related VR PM job.

At 1004, a first response can be received from the EM indicating a result of the first request to create the VNF related VR PM job.

At 1006, a second request can be sent to the EM to create one or more thresholds to monitor the VNF related VR PM data.

At 1008, a second response can be received from the EM indicating the result of the second request to create the threshold(s).

At 1010, a third request can be sent to the EM to subscribe to one or more threshold crossing notifications (e.g., one or more created at 1006 and 1008 and/or one or more previously created, etc.).

At 1012, a third response can be received from the EM indicating the result of the third request to subscribe to one or more threshold crossing notifications.

At 1014, a notification can be received from the EM indicating that one or more thresholds have been crossed (e.g., one or more threshold crossings subscribed to at 1010 and 1012 and/or one or more previously subscribed threshold crossings, etc.).

Additionally or alternatively, method 1000 can include one or more other acts described above in connection with system 400.

Figure 11:
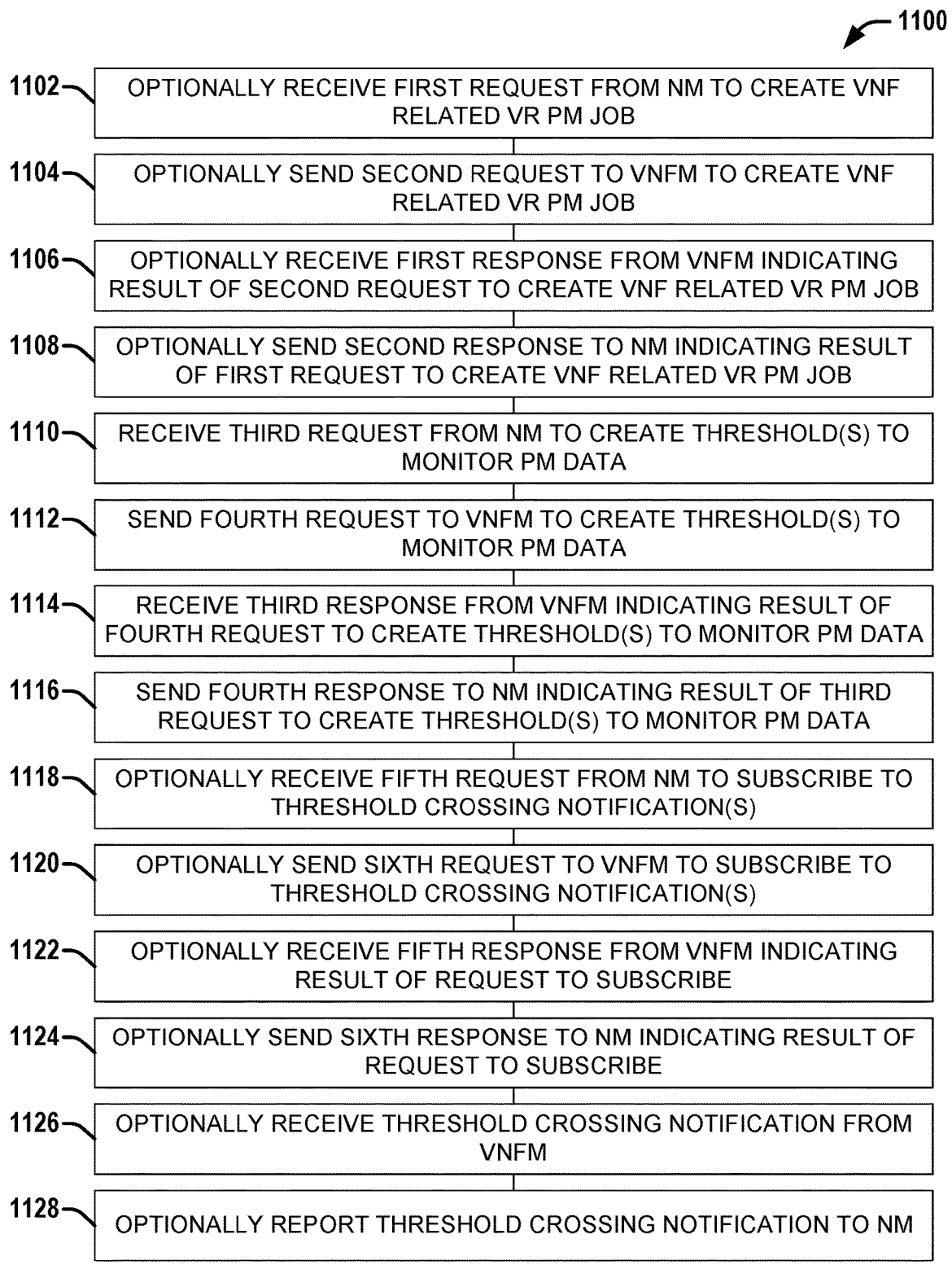
FIG. 11 is a flow diagram of a method that facilitates threshold creation and associated operations by an EM according to various aspects described herein.

Referring to FIG. 11, illustrated is a flow diagram of a method 1100 that facilitates threshold creation and associated operations by an EM according to various aspects described herein. In some aspects, method 1100 can be performed at an EM. In other aspects, a machine readable medium can store instructions associated with method 1100 that, when executed, can cause an EM to perform the acts of method 1100.

At 1102, optionally, a first request can be received from a NM to create a VNF related VR PM job.

At 1104, optionally, a second request can be sent to a VNFM to create the VNF related VR PM job.

At 1106, optionally, a first response can be received from the VNFM indicating a result of the second request to create the VNF related VR PM job.

At 1108, optionally, a second response can be sent to the NM indicating the result of the first request to create the VNF related VR PM job.

At 1110, a third request can be received from the NM to create one or more thresholds to monitor PM data (e.g., associated with the VNF related VR PM job created at 1102-1108 and/or one or more other VNF related VR PM jobs, etc.).

At 1112, a fourth request can be sent to the VNFM to create the threshold(s) to monitor the PM data.

At 1114, a third response can be received from the VNFM indicating a result of the fourth request to create the threshold(s) to monitor the PM data.

At 1116, a fourth response can be sent to the NM indicating a result of the third request to create the threshold(s) to monitor the PM data.

At 1118, optionally, a fifth request can be received from the NM to subscribe to one or more threshold crossing (TC) notifications (e.g., associated with the threshold(s) created at 1110-1116 and/or one or more other thresholds).

At 1120, optionally, a sixth request can be sent to the VNFM to subscribe to the TC notification(s).

At 1122, optionally, a fifth response can be received from the VNFM indicating a result of the sixth request to subscribe.

At 1124, optionally, a sixth response can be sent to the NM indicating a result of the fifth request to subscribe.

At 1126, optionally, one or more TC notifications associated with subscribed TC(s) can be received from the VNFM.

At 1128, optionally, the TC notification(s) can be reported to the NM.

Additionally or alternatively, method 1100 can include one or more other acts described above in connection with system 500.

Figure 12:
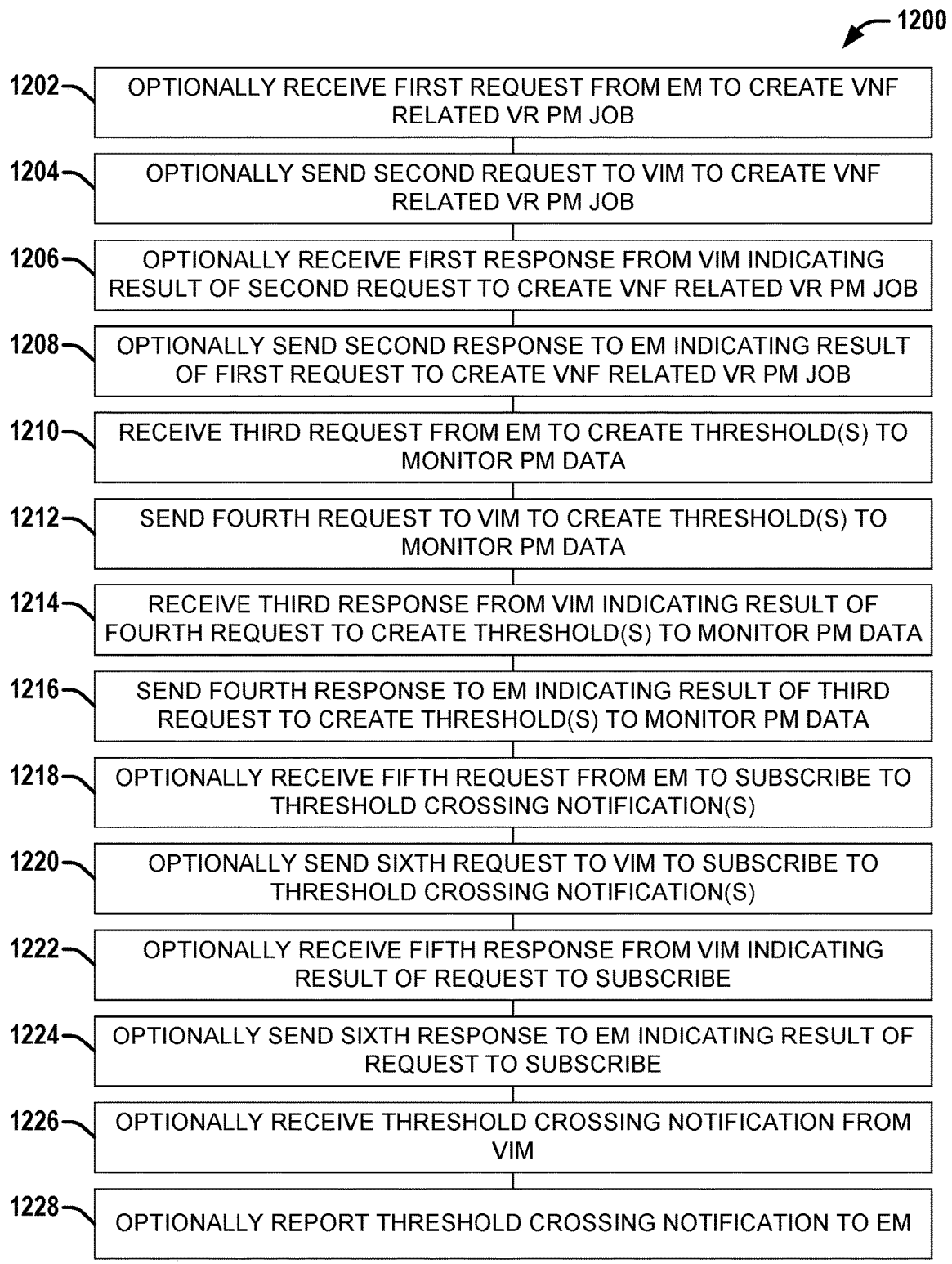
FIG. 12 is a flow diagram of a method that facilitates threshold creation and associated operations by a VNFM according to various aspects described herein.

Referring to FIG. 12, illustrated is a flow diagram of a method 1200 that facilitates threshold creation and associated operations by a VNFM according to various aspects described herein. In some aspects, method 1200 can be performed at a VNFM. In other aspects, a machine readable medium can store instructions associated with method 1200 that, when executed, can cause a VNFM to perform the acts of method 1200.

At 1202, optionally, a first request can be received from an EM to create a VNF related VR PM job.

At 1204, optionally, a second request can be sent to a VIM to create the VNF related VR PM job.

At 1206, optionally, a first response can be received from the VIM indicating a result of the second request to create the VNF related VR PM job.

At 1208, optionally, a second response can be sent to the EM indicating the result of the first request to create the VNF related VR PM job.

At 1210, a third request can be received from the EM to create one or more thresholds to monitor PM data (e.g., associated with the VNF related VR PM job created at 1202-1208 and/or one or more other VNF related VR PM jobs, etc.).

At 1212, a fourth request can be sent to the VIM to create the threshold(s) to monitor the PM data.

At 1214, a third response can be received from the VIM indicating a result of the fourth request to create the threshold(s) to monitor the PM data.

At 1216, a fourth response can be sent to the EM indicating a result of the third request to create the threshold(s) to monitor the PM data.

At 1218, optionally, a fifth request can be received from the EM to subscribe to one or more threshold crossing (TC) notifications (e.g., associated with the threshold(s) created at 1210-1216 and/or one or more other thresholds).

At 1220, optionally, a sixth request can be sent to the VIM to subscribe to the TC notification(s).

At 1222, optionally, a fifth response can be received from the VIM indicating a result of the sixth request to subscribe.

At 1224, optionally, a sixth response can be sent to the EM indicating a result of the fifth request to subscribe.

At 1226, optionally, one or more TC notifications associated with subscribed TC(s) can be received from the VIM.

At 1228, optionally, the TC notification(s) can be reported to the EM.

Additionally or alternatively, method 1200 can include one or more other acts described above in connection with system 600.

Figure 13:
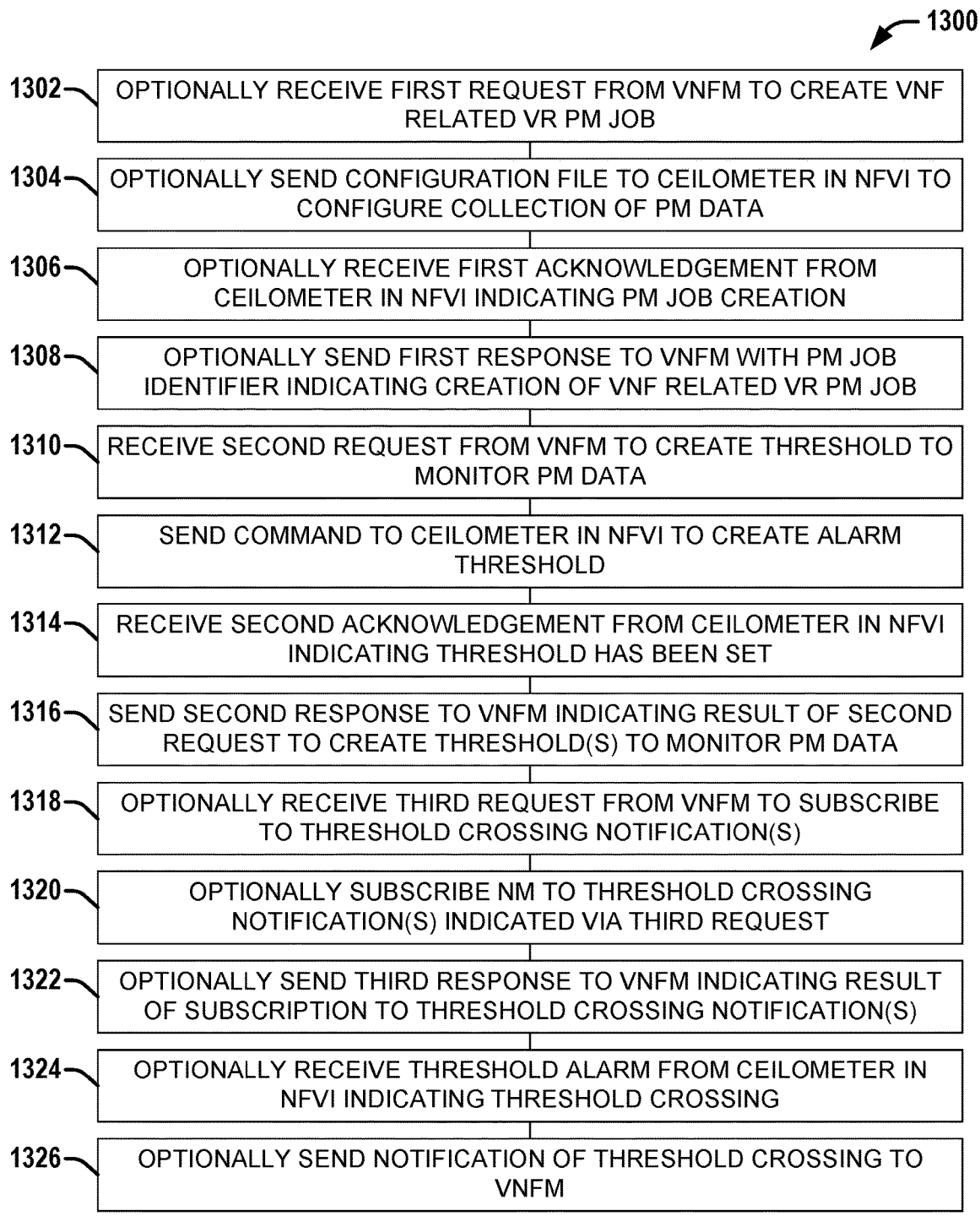
FIG. 13 is a flow diagram of a method that facilitates threshold creation and associated operations by a VIM according to various aspects described herein.

Referring to FIG. 13, illustrated is a flow diagram of a method 1300 that facilitates threshold creation and associated operations by a VIM according to various aspects described herein. In some aspects, method 1300 can be performed at a VIM. In other aspects, a machine readable medium can store instructions associated with method 1300 that, when executed, can cause a VIM to perform the acts of method 1300.

At 1302, optionally, a first request can be received from a VNFM to create a VNF related VR PM job.

At 1304, optionally, a configuration file can be sent to a data collection service (e.g., Ceilometer) in a NFVI to configure collection of PM data.

At 1306, optionally, a first acknowledgement can be received from the data collection service in the NFVI indicating creation of the VNF related VR PM job.

At 1308, optionally, a first response can be sent to the VNFM (e.g., comprising a PM job identifier of the VNF related VR PM job) that can indicate creation of the VNF related VR PM job.

At 1310, a second request can be received from the VNFM to create one or more thresholds to monitor PM data (e.g., PM data associated with the VNF related VR PM job created at 1302-1308 and/or one or more other VNF related VR PM jobs).

At 1312, a command can be sent to the data collection service (e.g., Ceilometer) in the NFVI to create one or more alarm thresholds (e.g., based on the threshold(s) of the second request).

At 1314, a second acknowledgement can be received from the data collection service (e.g., Ceilometer) in the NFVI, indicating that the threshold(s) have been set.

At 1316, a second response can be sent to the VNFM indicating a result of the second request to create the threshold(s) to monitor PM data.

At 1318, optionally, a third request can be received from the VNFM to subscribe to one or more TC notifications.

At 1320, optionally, an NM can be subscribed to the TC notification(s) indicated via the third request.

At 1322, optionally, a third response can be sent to the VNFM indicating a result of the subscription to the TC notification(s).

At 1324, optionally, one or more threshold alarms can be received from the data collection service (e.g., Ceilometer) in the NFVI, indicating that one or more thresholds have been crossed.

At 1326, optionally, a notification of the threshold crossing(s) associated with the threshold alarm(s) can be sent to the VNFM.

Additionally or alternatively, method 1300 can include one or more other acts described above in connection with system 700.

Figure 14:
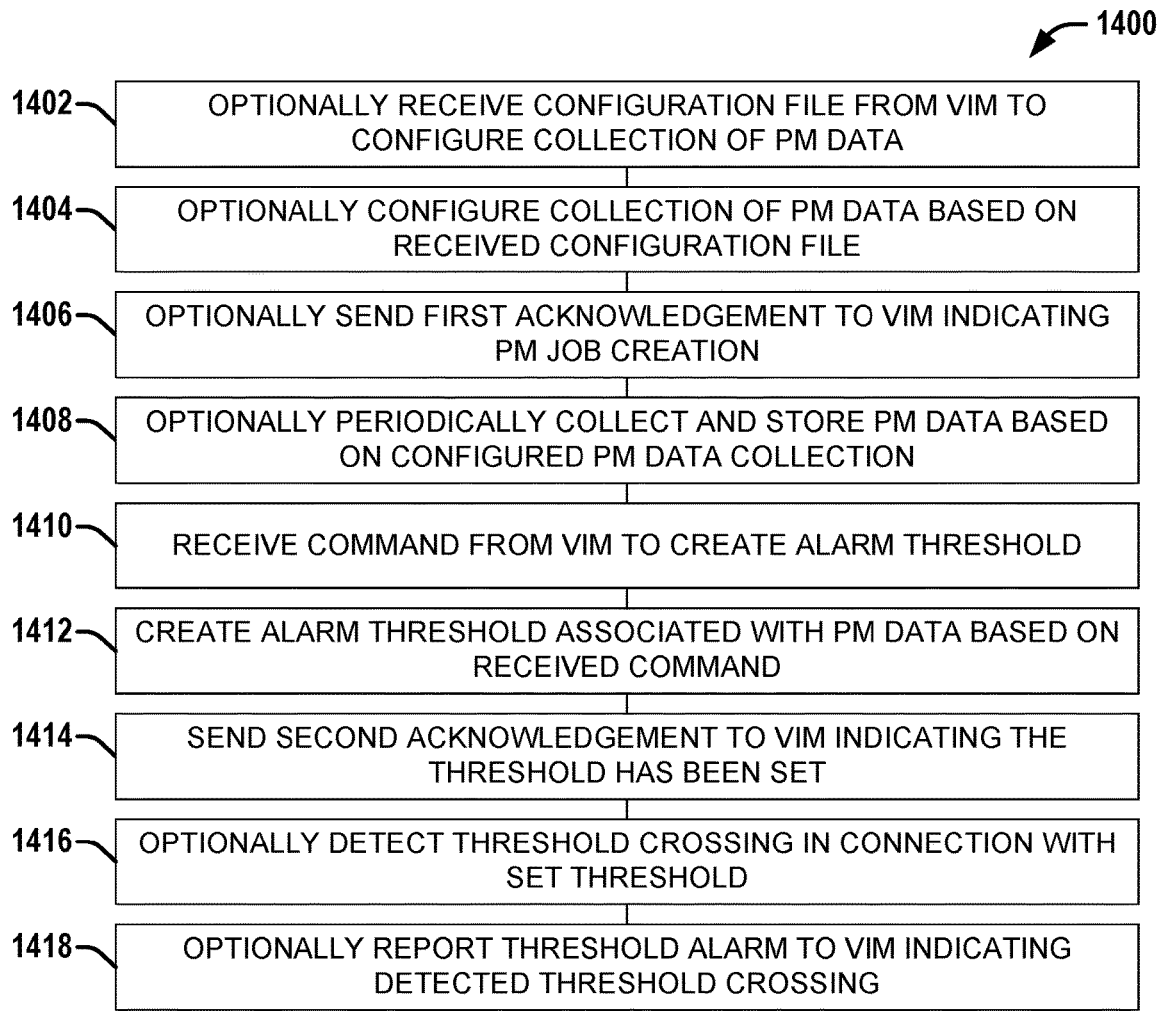
FIG. 14 is a flow diagram of a method that facilitates threshold creation and associated operations by a NFVI according to various aspects described herein.

Referring to FIG. 14, illustrated is a flow diagram of a method 1400 that facilitates threshold creation and associated operations by a NFVI according to various aspects described herein. In some aspects, method 1400 can be performed at a NFVI. In other aspects, a machine readable medium can store instructions associated with method 1400 that, when executed, can cause a NFVI to perform the acts of method 1400.

At 1402, optionally, a configuration file can be received from a VIM to configure collection of PM data.

At 1404, optionally, collection of PM data can be configured (e.g., via creation of a PM job) based on the received configuration file.

At 1406, optionally, a first acknowledgement can be sent to the VIM indicating creation of the PM job.

At 1408, optionally, PM data can be periodically collected and stored based on the configured PM data collection (e.g., according to the created PM job).

At 1410, a command can be received from the VIM to create one or more alarm thresholds (e.g., in connection with the PM data collected per 1402-1408 and/or other PM data).

At 1412, the one or more alarm thresholds associated with the PM data can be created based on the received command.

At 1414, a second acknowledgement can be sent to the VIM, wherein the second acknowledgement can indicate that the threshold(s) have been set.

At 1416, optionally, one or more threshold crossings (TCs) can be detected in connection with one or more set alarm thresholds (e.g., alarm threshold(s) set per 1410-1414 and/or one or more other alarm threshold(s)).

At 1418, optionally, one or more threshold alarms can be reported to the VIM indicating the detected TC(s).

Additionally or alternatively, method 1400 can include one or more other acts described above in connection with system 800.

Example 1 is an apparatus configured to be employed within a VIM (Virtualized Infrastructure Manager), comprising: a memory; and one or more processors configured to: receive a request from a VNFM (VNF (Virtual Network Function) Manager) to create one or more thresholds for monitoring one more measurement types associated with a VNF related VR (Virtualization Resource) PM (Performance Measurement) job; send a command to a data collection service of a NFVI (Network Function Virtualization Infrastructure) to create one or more alarm thresholds at the data collection service; receive an acknowledgement from the data collection service; and send a response to the VNFM that indicates one or more identifiers of the one or more thresholds, wherein the memory is configured to store the one or more identifiers.

Example 2 comprises the subject matter of any variation of any of example(s) 1, wherein the data collection service is a ceilometer.

Example 3 comprises the subject matter of any variation of any of example(s) 1, wherein the one or more measurement types are specified via a sourceSelector parameter of the request, wherein the sourceSelector (source selector) parameter defines resources for which performance information is requested to be collected.

Example 4 comprises the subject matter of any variation of any of example(s) 3, wherein the request comprises one or more of: a performanceMetric (performance metric) parameter that defines one or more performance metrics types for the resources; a thresholdType (threshold type) parameter that defines an associated threshold type for each of the one or more thresholds; or a thresholdDetails (threshold details) parameter that indicates one or more associated details for each of the one or more thresholds, wherein the one or more associated details comprise one or more of a value to be crossed, a direction to be crossed, or one or more details associated with a notification to be generated when that threshold is crossed.

Example 5 comprises the subject matter of any variation of any of example(s) 1-4, wherein the command is a restAPI (Representational State Transfer Application Programming Interface) command.

Example 6 comprises the subject matter of any variation of any of example(s) 1-4, wherein the response comprises one or more thresholdId (threshold identifier) parameters that identify the one or more thresholds.

Example 7 comprises the subject matter of any variation of any of example(s) 1-4, wherein the one or more processors are further configured to: receive a second request from the VNFM to create the VNF related VR PM job; send one or more configuration files to the data collection service in the NFVI to configure the collection of one or more PM measurements; receive a second acknowledgement from the NFVI in response to the one or more configuration files; and send a second response to the VNFM, wherein the second response comprises a pmJobId (PM job identifier) parameter that indicates a job identifier of the VNF related VR PM job.

Example 8 comprises the subject matter of any variation of any of example(s) 1-4, wherein the one or more processors are further configured to: receive a third request from the VNFM to subscribe to one or more TCs (threshold crossings) based on the one or more thresholds; and send a third response to the VNFM that comprises a subscriptionId (subscription identifier) parameter that identifies one or more subscriptions to the one or more TCs.

Example 9 comprises the subject matter of any variation of any of example(s) 1-4, wherein the one or more processors are further configured to: receive one or more reported threshold alarms from the data collection service in the NFVI; and send one or more TC (threshold crossing) notifications to the VNFM based on the one or more reported threshold alarms.

Example 10 comprises the subject matter of any variation of any of example(s) 1-2, wherein the one or more measurement types are specified via a sourceSelector parameter of the request, wherein the sourceSelector (source selector) parameter defines resources for which performance information is requested to be collected.

Example 11 comprises the subject matter of any variation of any of example(s) 10, wherein the request comprises one or more of: a performanceMetric (performance metric) parameter that defines one or more performance metrics types for the resources; a thresholdType (threshold type) parameter that defines an associated threshold type for each of the one or more thresholds; or a thresholdDetails (threshold details) parameter that indicates one or more associated details for each of the one or more thresholds, wherein the one or more associated details comprise one or more of a value to be crossed, a direction to be crossed, or one or more details associated with a notification to be generated when that threshold is crossed.

Example 12 comprises the subject matter of any variation of any of example(s) 1-2 or 10-11, wherein the command is a restAPI (Representational State Transfer Application Programming Interface) command.

Example 13 comprises the subject matter of any variation of any of example(s) 1-2 or 10-12, wherein the response comprises one or more thresholdId (threshold identifier) parameters that identify the one or more thresholds.

Example 14 comprises the subject matter of any variation of any of example(s) 1-2 or 10-13, wherein the one or more processors are further configured to: receive a second request from the VNFM to create the VNF related VR PM job; send one or more configuration files to the data collection service in the NFVI to configure the collection of one or more PM measurements; receive a second acknowledgement from the NFVI in response to the one or more configuration files; and send a second response to the VNFM, wherein the second response comprises a pmJobId (PM job identifier) parameter that indicates a job identifier of the VNF related VR PM job.

Example 15 comprises the subject matter of any variation of any of example(s) 1-2 or 10-14, wherein the one or more processors are further configured to: receive a third request from the VNFM to subscribe to one or more TCs (threshold crossings) based on the one or more thresholds; and send a third response to the VNFM that comprises a subscriptionId (subscription identifier) parameter that identifies one or more subscriptions to the one or more TCs.

Example 16 comprises the subject matter of any variation of any of example(s) 1-2 or 10-15, wherein the one or more processors are further configured to: receive one or more reported threshold alarms from the data collection service in the NFVI; and send one or more TC (threshold crossing) notifications to the VNFM based on the one or more reported threshold alarms.

Example 17 is an apparatus configured to be employed within a NFVI (Network Function Virtualization Infrastructure), comprising: a memory; and one or more processors configured to: receive a command at a data collection service of the NFVI to create one or more alarm thresholds in connection with a VNF (Virtual Network Function) related VR (Virtualization Resource) PM (Performance Measurement) job, wherein the command is received from a VIM (Virtualized Infrastructure Manager); and send an acknowledgement to the VIM in response to the command, wherein the memory is configured to store the command.

Example 18 comprises the subject matter of any variation of any of example(s) 17, wherein the data collection service is a ceilometer.

Example 19 comprises the subject matter of any variation of any of example(s) 17, wherein the command is a restAPI (Representational State Transfer Application Programming Interface) command.

Example 20 comprises the subject matter of any variation of any of example(s) 17, wherein the one or more processors are further configured to create the one or more alarm thresholds.

Example 21 comprises the subject matter of any variation of any of example(s) 17-20, wherein the one or more processors are further configured to: receive, from the VIM, one or more configuration files for configuring the collection of one or more PM measurements; load the one or more configuration files; send a second acknowledgement to the VIM in response to the one or more configuration files; periodically collect VR PM data based on an interval defined in the VNF related VR PM job; and store the periodically collected VR PM data in a database of the data collection service.

Example 22 comprises the subject matter of any variation of any of example(s) 21, wherein the one or more configuration files comprise a pipeline.yaml configuration file.

Example 23 comprises the subject matter of any variation of any of example(s) 17-20, wherein the one or more processors are further configured to: detect a TC (threshold crossing) associated with a first threshold alarm of the one or more threshold alarms; and send a report of the TC associated with the first threshold alarm to the VIM.

Example 24 comprises the subject matter of any variation of any of example(s) 17-18, wherein the one or more processors are further configured to create the one or more alarm thresholds.

Example 25 comprises the subject matter of any variation of any of example(s) 17-18 or 24, wherein the one or more processors are further configured to: receive, from the VIM, one or more configuration files for configuring the collection of one or more PM measurements; load the one or more configuration files; send a second acknowledgement to the VIM in response to the one or more configuration files; periodically collect VR PM data based on an interval defined in the VNF related VR PM job; and store the periodically collected VR PM data in a database of the data collection service.

Example 26 comprises the subject matter of any variation of any of example(s) 25, wherein the one or more configuration files comprise a pipeline.yaml configuration file.

Example 27 comprises the subject matter of any variation of any of example(s) 17-18 or 24-26, wherein the one or more processors are further configured to: detect a TC (threshold crossing) associated with a first threshold alarm of the one or more threshold alarms; and send a report of the TC associated with the first threshold alarm to the VIM.

Example 28 is a machine readable medium comprising instructions that, when executed, cause a VIM (Virtualized Infrastructure Manager) to: receive a request from a VNFM (VNF (Virtual Network Function) Manager) to create a threshold to monitor a measurement type associated with a VNF related VR (Virtualization Resource) PM (Performance Measurement) job, wherein the request comprises a sourceSelector (source selector) parameter that defines resources for which performance information is requested to be collected, a performanceMetric (performance metric) parameter that defines a performance metric type for the resources, a thresholdType (threshold type) parameter that defines a type of the threshold, and a thresholdDetails (threshold details) parameter that indicates one or more details of the threshold; send a restAPI (Representational State Transfer Application Programming Interface) command to a ceilometer of a NFVI (Network Function Virtualization Infrastructure) to create an alarm threshold at the ceilometer; receive an acknowledgement from the ceilometer of the NFVI; and send a response to the VNFM comprising a thresholdId (threshold identifier) parameter that indicates an identifier of the threshold.

Example 29 comprises the subject matter of any variation of any of example(s) 28, wherein the instructions, when executed, further cause the VIM to: receive a second request from the VNFM to create the PM job; send a configuration file to the ceilometer to configure the collection of a PM measurement; receive a second acknowledgement from the ceilometer; and send a second response to the VNFM comprising a pmJobId (PM job identifier) parameter that identifies the PM job.

Example 30 comprises the subject matter of any variation of any of example(s) 29, wherein the configuration file is a pipeline.yaml configuration file.

Example 31 comprises the subject matter of any variation of any of example(s) 29, wherein the PM measurement is one of: a mean CPU (Central Processing Unit) usage, a peak memory usage, a number of octets of outgoing IP (Internet Protocol) packets, or a number of outgoing IP packets.

Example 32 comprises the subject matter of any variation of any of example(s) 28-31, wherein the instructions, when executed, further cause the VIM to: receive a third request from the VNFM to subscribe to a TC (threshold crossing) notification, wherein the third request comprises a filter parameter that selects the TC notification and indicates one or more of a resource associated with the TC notification, a notification type of the TC notification, or one or more attributes of the TC notification; and send a third response to the VNFM to indicate a subscription of the TCC notification, wherein the third response comprises a subscriptionId (subscription identifier) parameter that identifies the subscription.

Example 33 comprises the subject matter of any variation of any of example(s) 28-31, wherein the instructions, when executed, further cause the VIM to: receive a report of a threshold alarm from the ceilometer; and send a TC (threshold crossing) notification to the VNFM.

Example 34 is a machine readable medium comprising instructions that, when executed, cause a NFVI (Network Function Virtualization Infrastructure) to: receive, from a VIM (Virtualized Infrastructure Manager), a restAPI (Representational State Transfer Application Programming Interface) command at a ceilometer of the NFVI to create an alarm threshold in connection with a VNF related VR (Virtualization Resource) PM (Performance Measurement) job; and send an acknowledgement from the ceilometer to the VIM.

Example 35 comprises the subject matter of any variation of any of example(s) 34, wherein the instructions, when executed, further cause the NFVI to: receive, from the VIM, a configuration file at the ceilometer to configure the collection of a PM measurement; create the VNF related VR PM job; send a second acknowledgement to the VIM; periodically collect VR PM data at an interval defined in connection with the VNF related VR PM job; and save the periodically collected VR PM data in a database of the ceilometer.

Example 36 comprises the subject matter of any variation of any of example(s) 34-35, wherein the instructions, when executed, further cause the NFVI to: detect a threshold alarm; and report the threshold alarm to the VIM.

Example 37 is a machine readable medium comprising instructions that, when executed, cause a Virtualized Infrastructure Manager (VIM) to: receive a request from a VNFM (VNF (Virtual Network Function) Manager) to create one or more thresholds for monitoring one more measurement types associated with a VNF related VR (Virtualization Resource) PM (Performance Measurement) job; send a command to a data collection service of a NFVI (Network Function Virtualization Infrastructure) to create one or more alarm thresholds at the data collection service; receive an acknowledgement from the data collection service; and send a response to the VNFM that indicates one or more identifiers of the one or more thresholds.

Example 38 comprises the subject matter of any variation of any of example(s) 37, wherein the data collection service is a ceilometer.

Example 39 comprises the subject matter of any variation of any of example(s) 37, wherein the one or more measurement types are specified via a sourceSelector parameter of the request, wherein the sourceSelector (source selector) parameter defines resources for which performance information is requested to be collected.

Example 40 comprises the subject matter of any variation of any of example(s) 39, wherein the request comprises one or more of: a performanceMetric (performance metric) parameter that defines one or more performance metrics types for the resources; a thresholdType (threshold type) parameter that defines an associated threshold type for each of the one or more thresholds; or a thresholdDetails (threshold details) parameter that indicates one or more associated details for each of the one or more thresholds, wherein the one or more associated details comprise one or more of a value to be crossed, a direction to be crossed, or one or more details associated with a notification to be generated when that threshold is crossed.

Example 41 comprises the subject matter of any variation of any of example(s) 37-40, wherein the command is a restAPI (Representational State Transfer Application Programming Interface) command.

Example 42 comprises the subject matter of any variation of any of example(s) 37-40, wherein the response comprises one or more thresholdId (threshold identifier) parameters that identify the one or more thresholds.

Example 43 comprises the subject matter of any variation of any of example(s) 37-40, wherein the instructions, when executed, further cause the VIM to: receive a second request from the VNFM to create the VNF related VR PM job; send one or more configuration files to the data collection service in the NFVI to configure the collection of one or more PM measurements; receive a second acknowledgement from the NFVI in response to the one or more configuration files; and send a second response to the VNFM, wherein the second response comprises a pmJobId (PM job identifier) parameter that indicates a job identifier of the VNF related VR PM job.

Example 44 comprises the subject matter of any variation of any of example(s) 37-40, wherein the instructions, when executed, further cause the VIM to: receive a third request from the VNFM to subscribe to one or more TCs (threshold crossings) based on the one or more thresholds; and send a third response to the VNFM that comprises a subscriptionId (subscription identifier) parameter that identifies one or more subscriptions to the one or more TCs.

Example 45 comprises the subject matter of any variation of any of example(s) 37-40, wherein the instructions, when executed, further cause the VIM to: receive one or more reported threshold alarms from the data collection service in the NFVI; and send one or more TC (threshold crossing) notifications to the VNFM based on the one or more reported threshold alarms.

Example 46 comprises the subject matter of any variation of any of example(s) 37-38, wherein the one or more measurement types are specified via a sourceSelector parameter of the request, wherein the sourceSelector (source selector) parameter defines resources for which performance information is requested to be collected.

Example 47 comprises the subject matter of any variation of any of example(s) 46, wherein the request comprises one or more of: a performanceMetric (performance metric) parameter that defines one or more performance metrics types for the resources; a thresholdType (threshold type) parameter that defines an associated threshold type for each of the one or more thresholds; or a thresholdDetails (threshold details) parameter that indicates one or more associated details for each of the one or more thresholds, wherein the one or more associated details comprise one or more of a value to be crossed, a direction to be crossed, or one or more details associated with a notification to be generated when that threshold is crossed.

Example 48 comprises the subject matter of any variation of any of example(s) 37-38 or 46-47, wherein the command is a restAPI (Representational State Transfer Application Programming Interface) command.

Example 49 comprises the subject matter of any variation of any of example(s) 37-38 or 46-48, wherein the response comprises one or more thresholdId (threshold identifier) parameters that identify the one or more thresholds.

Example 50 comprises the subject matter of any variation of any of example(s) 37-38 or 46-49, wherein the instructions, when executed, further cause the VIM to: receive a second request from the VNFM to create the VNF related VR PM job; send one or more configuration files to the data collection service in the NFVI to configure the collection of one or more PM measurements; receive a second acknowledgement from the NFVI in response to the one or more configuration files; and send a second response to the VNFM, wherein the second response comprises a pmJobId (PM job identifier) parameter that indicates a job identifier of the VNF related VR PM job.

Example 51 comprises the subject matter of any variation of any of example(s) 37-38 or 46-50, wherein the instructions, when executed, further cause the VIM to: receive a third request from the VNFM to subscribe to one or more TCs (threshold crossings) based on the one or more thresholds; and send a third response to the VNFM that comprises a subscriptionId (subscription identifier) parameter that identifies one or more subscriptions to the one or more TCs.

Example 52 comprises the subject matter of any variation of any of example(s) 37-38 or 46-51, wherein the instructions, when executed, further cause the VIM to: receive one or more reported threshold alarms from the data collection service in the NFVI; and send one or more TC (threshold crossing) notifications to the VNFM based on the one or more reported threshold alarms.

Example 53 is a machine readable medium comprising instructions that, when executed, cause a NFVI (Network Function Virtualization Infrastructure) to: receive a command at a data collection service of the NFVI to create one or more alarm thresholds in connection with a VNF (Virtual Network Function) related VR (Virtualization Resource) PM (Performance Measurement) job, wherein the command is received from a VIM (Virtualized Infrastructure Manager); and send an acknowledgement to the VIM in response to the command.

Example 54 comprises the subject matter of any variation of any of example(s) 53, wherein the data collection service is a ceilometer.

Example 55 comprises the subject matter of any variation of any of example(s) 53, wherein the command is a restAPI (Representational State Transfer Application Programming Interface) command.

Example 56 comprises the subject matter of any variation of any of example(s) 53, wherein the one or more processors are further configured to create the one or more alarm thresholds.

Example 57 comprises the subject matter of any variation of any of example(s) 53-56, wherein the instructions, when executed, further cause the NFVI to: receive, from the VIM, one or more configuration files for configuring the collection of one or more PM measurements; load the one or more configuration files; send a second acknowledgement to the VIM in response to the one or more configuration files; periodically collect VR PM data based on an interval defined in the VNF related VR PM job; and store the periodically collected VR PM data in a database of the data collection service.

Example 58 comprises the subject matter of any variation of any of example(s) 57, wherein the one or more configuration files comprise a pipeline.yaml configuration file.

Example 59 comprises the subject matter of any variation of any of example(s) 53-56, wherein the instructions, when executed, further cause the NFVI to: detect a TC (threshold crossing) associated with a first threshold alarm of the one or more threshold alarms; and send a report of the TC associated with the first threshold alarm to the VIM.

Example 60 comprises the subject matter of any variation of any of example(s) 53-54, wherein the one or more processors are further configured to create the one or more alarm thresholds.

Example 61 comprises the subject matter of any variation of any of example(s) 53-54 or 60, wherein the instructions, when executed, further cause the NFVI to: receive, from the VIM, one or more configuration files for configuring the collection of one or more PM measurements; load the one or more configuration files; send a second acknowledgement to the VIM in response to the one or more configuration files; periodically collect VR PM data based on an interval defined in the VNF related VR PM job; and store the periodically collected VR PM data in a database of the data collection service.

Example 62 comprises the subject matter of any variation of any of example(s) 61, wherein the one or more configuration files comprise a pipeline.yaml configuration file.

Example 63 comprises the subject matter of any variation of any of example(s) 53-54 or 60-62, wherein the instructions, when executed, further cause the NFVI to: detect a TC (threshold crossing) associated with a first threshold alarm of the one or more threshold alarms; and send a report of the TC associated with the first threshold alarm to the VIM.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within a VIM (Virtualized Infrastructure Manager), comprising:
   a memory; and
   one or more processors configured to:
   receive a request from a VNFM (VNF (Virtual Network Function) Manager) to create one or more thresholds for monitoring one more measurement types associated with a VNF related VR (Virtualization Resource) PM (Performance Measurement) job;
   send a command to a data collection service of a NFVI (Network Function Virtualization Infrastructure) to create one or more alarm thresholds at the data collection service;
   receive an acknowledgement from the data collection service; and
   send a response to the VNFM that indicates one or more identifiers of the one or more thresholds,
   wherein the memory is configured to store the one or more identifiers.

2. The apparatus of claim 1, wherein the data collection service is a ceilometer.

3. The apparatus of claim 1, wherein the one or more measurement types are specified via a sourceSelector parameter of the request, wherein the sourceSelector (source selector) parameter defines resources for which performance information is requested to be collected.

4. The apparatus of claim 3, wherein the request comprises one or more of: a performance Metric (performance metric) parameter that defines one or more performance metrics types for the resources; a thresholdType (threshold type) parameter that defines an associated threshold type for each of the one or more thresholds; or a thresholdDetails (threshold details) parameter that indicates one or more associated details for each of the one or more thresholds, wherein the one or more associated details comprise one or more of a value to be crossed, a direction to be crossed, or one or more details associated with a notification to be generated when that threshold is crossed.

5. The apparatus of claim 1, wherein the command is a restAPI (Representational State Transfer Application Programming Interface) command.

6. The apparatus of claim 1, wherein the response comprises one or more thresholdId (threshold identifier) parameters that identify the one or more thresholds.

7. The apparatus of claim 1, wherein the one or more processors are further configured to:
   receive a second request from the VNFM to create the VNF related VR PM job;
   send one or more configuration files to the data collection service in the NFVI to configure the collection of one or more PM measurements;
   receive a second acknowledgement from the NFVI in response to the one or more configuration files; and
   send a second response to the VNFM, wherein the second response comprises a pmJobId (PM job identifier) parameter that indicates a job identifier of the VNF related VR PM job.

8. The apparatus of claim 1, wherein the one or more processors are further configured to:
receive a third request from the VNFM to subscribe to one or more TCs (threshold crossings) based on the one or more thresholds; and
send a third response to the VNFM that comprises a subscription Id (subscription identifier) parameter that identifies one or more subscriptions to the one or more TCs.

9. The apparatus of claim 1, wherein the one or more processors are further configured to:
receive one or more reported threshold alarms from the data collection service in the NFVI; and
send one or more TC (threshold crossing) notifications to the VNFM based on the one or more reported threshold alarms.

10. An apparatus configured to be employed within a NFVI (Network Function Virtualization Infrastructure), comprising:
a memory; and
one or more processors configured to:
receive a command at a data collection service of the NFVI to create one or more alarm thresholds in connection with a VNF (Virtual Network Function) related VR (Virtualization Resource) PM (Performance Measurement) job, wherein the command is received from a VIM (Virtualized Infrastructure Manager); and
send an acknowledgement to the VIM in response to the command, wherein the memory is configured to store the command.

11. The apparatus of claim 10, wherein the data collection service is a ceilometer.

12. The apparatus of claim 10, wherein the command is a restAPI (Representational State Transfer Application Programming Interface) command.

13. The apparatus of claim 10, wherein the one or more processors are further configured to create the one or more alarm thresholds.

14. The apparatus of claim 10, wherein the one or more processors are further configured to:
receive, from the VIM, one or more configuration files for configuring the collection of one or more PM measurements;
load the one or more configuration files;
send a second acknowledgement to the VIM in response to the one or more configuration files;
periodically collect VR PM data based on an interval defined in the VNF related VR PM job; and
store the periodically collected VR PM data in a database of the data collection service.

15. The apparatus of claim 14, wherein the one or more configuration files comprise a pipeline.yaml configuration file.

16. The apparatus of claim 10, wherein the one or more processors are further configured to:
detect a TC (threshold crossing) associated with a first threshold alarm of the one or more threshold alarms; and
send a report of the TC associated with the first threshold alarm to the VIM.

17. A non-transitory machine readable medium comprising instructions that, when executed, cause a VIM (Virtualized Infrastructure Manager) to:
receive a request from a VNFM (VNF (Virtual Network Function) Manager) to create a threshold to monitor a measurement type associated with a VNF related VR (Virtualization Resource) PM (Performance Measurement) job, wherein the request comprises a sourceSelector (source selector) parameter that defines resources for which performance information is requested to be collected, a performanceMetric (performance metric) parameter that defines a performance metric type for the resources, a thresholdType (threshold type) parameter that defines a type of the threshold, and a thresholdDetails (threshold details) parameter that indicates one or more details of the threshold;
send a restAPI (Representational State Transfer Application Programming Interface) command to a ceilometer of a NFVI (Network Function Virtualization Infrastructure) to create an alarm threshold at the ceilometer;
receive an acknowledgement from the ceilometer of the NFVI; and
send a response to the VNFM comprising a thresholdId (threshold identifier) parameter that indicates an identifier of the threshold.

18. The non-transitory machine readable medium of claim 17, wherein the instructions, when executed, further cause the VIM to:
receive a second request from the VNFM to create the PM job;
send a configuration file to the ceilometer to configure the collection of a PM measurement;
receive a second acknowledgement from the ceilometer; and
send a second response to the VNFM comprising a pmJobId (PM job identifier) parameter that identifies the PM job.

19. The non-transitory machine readable medium of claim 18, wherein the configuration file is a pipeline.yaml configuration file.

20. The non-transitory machine readable medium of claim 18, wherein the PM measurement is one of: a mean CPU (Central Processing Unit) usage, a peak memory usage, a number of octets of outgoing IP (Internet Protocol) packets, or a number of outgoing IP packets.

21. The non-transitory machine readable medium of claim 17, wherein the instructions, when executed, further cause the VIM to:
receive a third request from the VNFM to subscribe to a TC (threshold crossing) notification, wherein the third request comprises a filter parameter that selects the TC notification and indicates one or more of a resource associated with the TC notification, a notification type of the TC notification, or one or more attributes of the TC notification; and
send a third response to the VNFM to indicate a subscription of the TCC notification, wherein the third response comprises a subscriptionId (subscription identifier) parameter that identifies the subscription.

22. The non-transitory machine readable medium of claim 17, wherein the instructions, when executed, further cause the VIM to:
receive a report of a threshold alarm from the ceilometer; and
send a TC (threshold crossing) notification to the VNFM.

23. A non-transitory machine readable medium comprising instructions that, when executed, cause a NFVI (Network Function Virtualization Infrastructure) to:
receive, from a VIM (Virtualized Infrastructure Manager), a restAPI (Representational State Transfer Application Programming Interface) command at a ceilometer of the NFVI to create an alarm threshold in connection with a VNF related VR (Virtualization Resource) PM (Performance Measurement) job; and
send an acknowledgement from the ceilometer to the VIM.

24. The non-transitory machine readable medium of claim 23, wherein the instructions, when executed, further cause the NFVI to:
receive, from the VIM, a configuration file at the ceilometer to configure the collection of a PM measurement;
create the VNF related VR PM job;
send a second acknowledgement to the VIM;
periodically collect VR PM data at an interval defined in connection with the VNF related VR PM job; and
save the periodically collected VR PM data in a database of the ceilometer.

25. The non-transitory machine readable medium of claim 23, wherein the instructions, when executed, further cause the NFVI to:
detect a threshold alarm; and
report the threshold alarm to the VIM.

* * * * *